(12) United States Patent
Story, Jr.

(10) Patent No.: US 7,121,776 B2
(45) Date of Patent: *Oct. 17, 2006

(54) HOUSING RETROFIT ASSEMBLY FOR A MILLING MACHINE OR THE LIKE

(76) Inventor: Paul J Story, Jr., 812 E. Worthington Ave., Charlotte, NC (US) 27203

(*) Notice: Subject to any disclaimer, the term of this patent is extended or adjusted under 35 U.S.C. 154(b) by 74 days.

This patent is subject to a terminal disclaimer.

(21) Appl. No.: 10/940,906

(22) Filed: Sep. 14, 2004

(65) Prior Publication Data

US 2005/0042053 A1 Feb. 24, 2005

Related U.S. Application Data

(63) Continuation-in-part of application No. 10/653,482, filed on Sep. 2, 2003, now Pat. No. 6,789,986.

(51) Int. Cl.
*B23C 1/12* (2006.01)
*B23C 7/60* (2006.01)
*B23Q 21/00* (2006.01)

(52) U.S. Cl. ............ 409/218; 409/184; 409/210; 408/241 S; 408/14; 411/433

(58) Field of Classification Search ........ 409/218, 409/214, 184, 210; 408/241 S, 14, 135, 408/16, 136, 234, 236; 411/433, 294, 295
See application file for complete search history.

(56) References Cited

U.S. PATENT DOCUMENTS

| | | | | | |
|---|---|---|---|---|---|
| 4,048,897 A | * | 9/1977 | Price, Jr. | .................... | 411/433 |
| 4,521,144 A | * | 6/1985 | Ginter | ........................ | 409/218 |
| 4,787,794 A | * | 11/1988 | Guthrie | ....................... | 408/16 |
| 4,978,261 A | * | 12/1990 | Wright, III | ................. | 409/218 |
| 5,252,010 A | * | 10/1993 | Obrecht et al. | ............. | 409/218 |
| 5,286,147 A | * | 2/1994 | Escobedo et al. | ........... | 409/218 |
| 5,330,298 A | * | 7/1994 | Welch et al. | ............... | 409/185 |
| 5,634,748 A | * | 6/1997 | Brazell et al. | ............... | 408/89 |
| 5,795,110 A | * | 8/1998 | Wirth et al. | ............. | 408/241 S |
| 5,888,033 A | * | 3/1999 | Zagar et al. | .................. | 408/14 |
| 5,941,663 A | * | 8/1999 | Elrod et al. | .................. | 409/80 |
| 5,947,664 A | * | 9/1999 | Espinosa | .................... | 409/218 |
| 6,095,728 A | * | 8/2000 | Howie | ........................ | 409/214 |

* cited by examiner

*Primary Examiner*—Monica Carter
*Assistant Examiner*—Dana Ross
(74) *Attorney, Agent, or Firm*—Dougherty Clements

(57) ABSTRACT

The present invention is a housing retrofit assembly for a milling machine or the like, including a quick adjusting stop nut for selective sliding coarse adjustment and rotational precision fine adjustment for rotatable engagement with a threaded rod or shaft in close tolerances, which provides stable precision engagement with the shaft, and which provides a positive locking mechanism. A unique lighting assembly is also disclosed which moves with the machine head for illuminating the milling cutter or the workpiece.

9 Claims, 20 Drawing Sheets

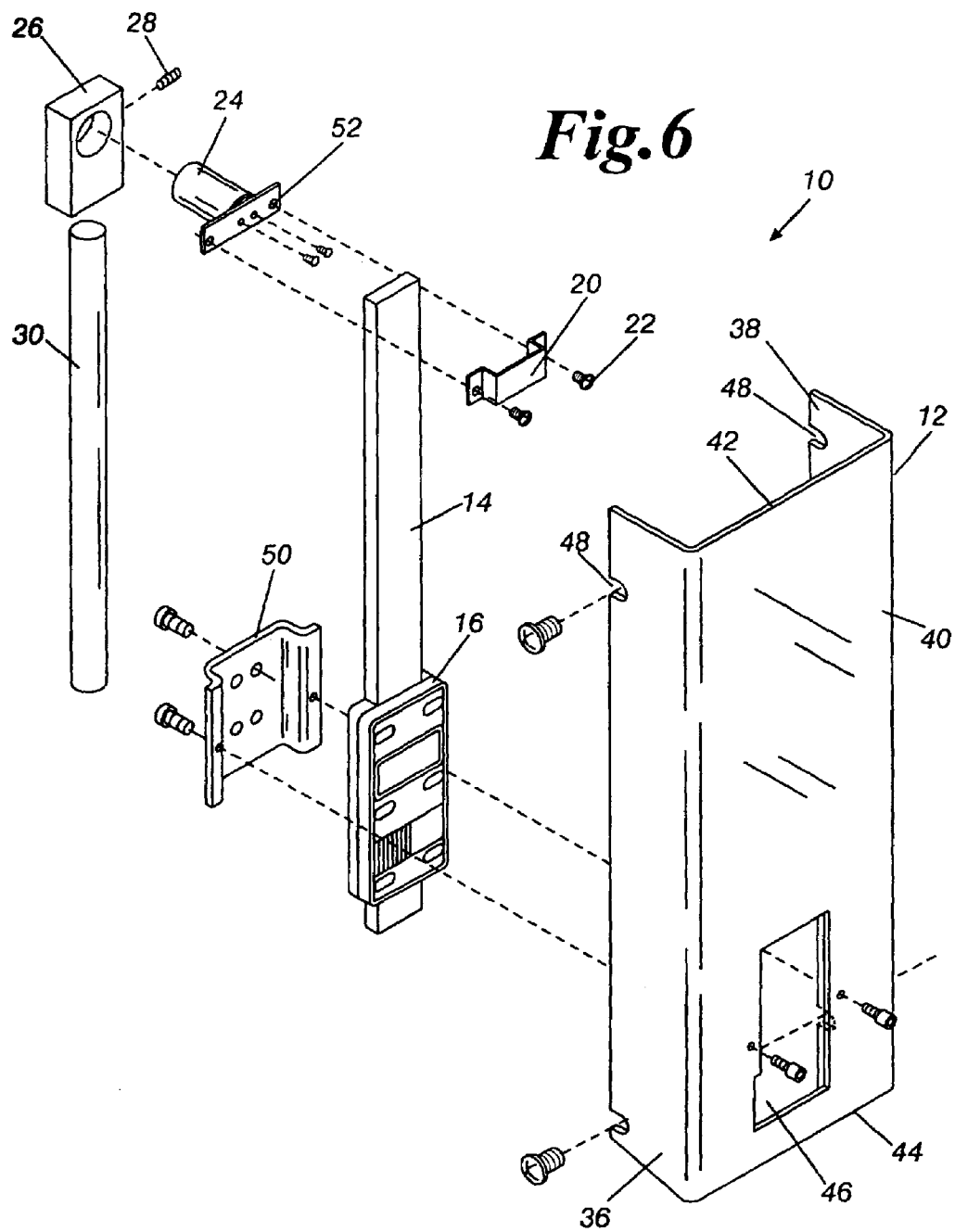

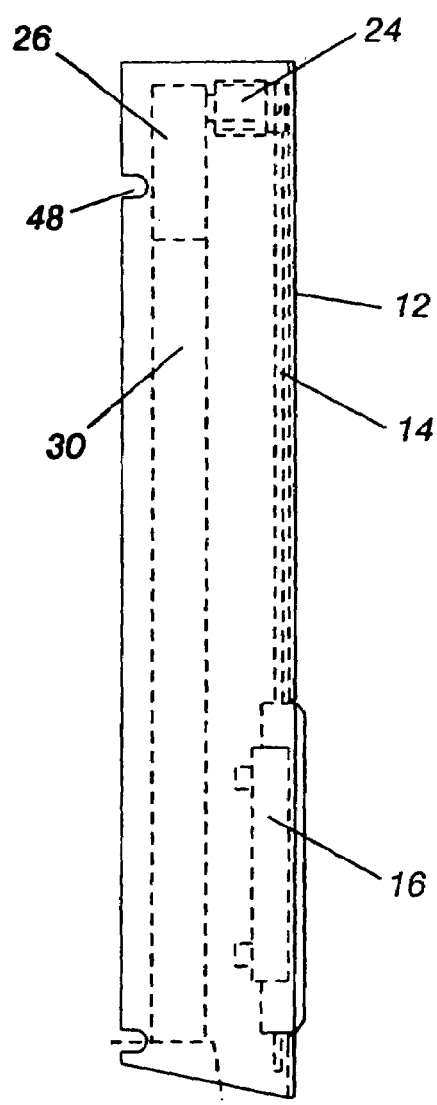
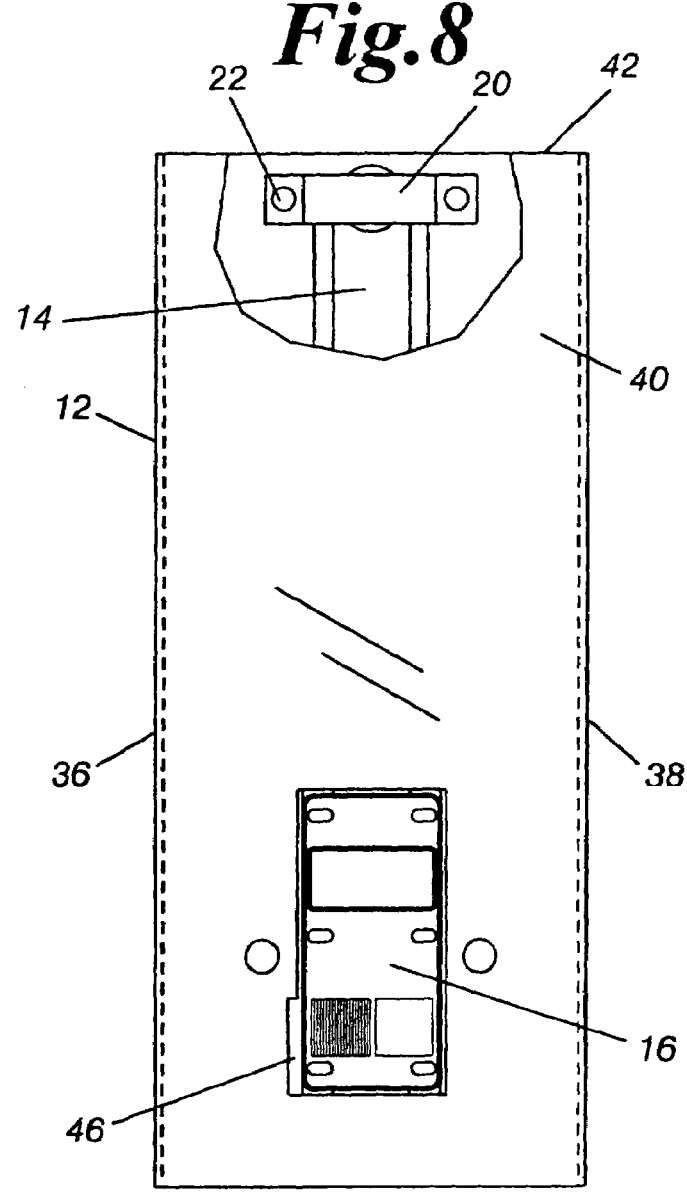

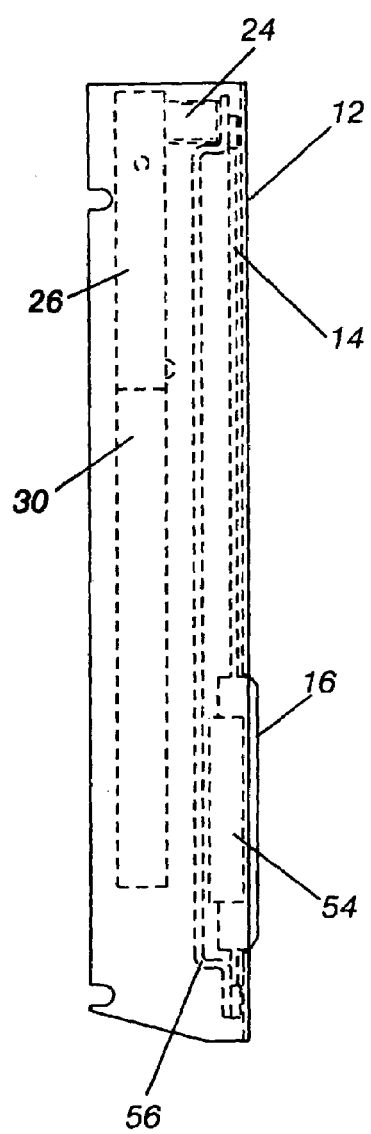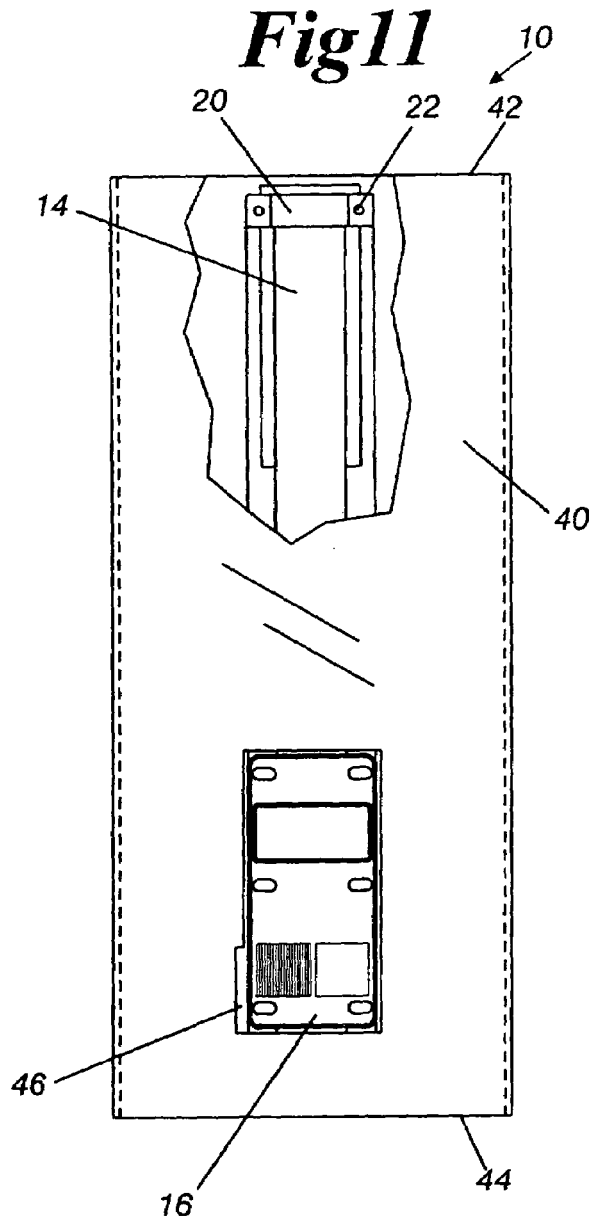

HOUSING RETROFIT ASSEMBLY FOR A MILLING MACHINE OR THE LIKE

CROSS REFERENCE TO RELATED APPLICATIONS

This application is a continuation-in-part of U.S. patent application Ser. No. 10/653,482, filed Sep. 2, 2003 now U.S. Pat. No. 6,789,986, which claims priority from U.S. patent application Ser. No. 10/222,252, filed Aug. 16, 2002, now U.S. Pat. No. 6,612,790, and claims the benefit of U.S. Provisional Application No. 60/312,969, filed Aug. 16, 2001.

FIELD OF THE INVENTION

The present invention relates generally to attachments for machine tools. The invention concerns a housing assembly that is adapted and retrofitted for use with vertical milling machines to measure the vertical travel, or milling depth, of the quill mechanism. More particularly, the invention concerns a stop mechanism for engagement with a threaded rod, and a control mechanism for the quill.

BACKGROUND

Vertical milling machines are known in the art and a number of different types of milling machines are commercially available. By way of example, Bridgeport® and RF Rong Fu® produce various models of milling machines. These commercially available milling machines are generally classified into two main divisions, vertical and horizontal. In the horizontal milling machines, the cutter is horizontally mounted to a spindle and moves in a horizontal manner. Similarly, in a vertical milling machine, the cutter is vertically disposed and moves in a vertical fashion.

A conventional vertical milling machine generally includes a table on which a workpiece can be supported, and a quill that supports a tool or cutter for movement toward and away from the table for milling the workpiece. Typically, the table is adjustable within the horizontal plane from side to side and from front to back relative to the quill. Although many milling machines are manual, in the sense that adjustment of the table and movement of the quill is manually achieved, improvements in the art have been made for fully automated machines. These automated machines provide some advantages over manual machines, however, they are considerably more expensive for users. Moreover, they lack the versatility of manual machines.

In addition to the above, many of the manual, vertical milling machines commercially available provide an already attached manual measuring apparatus for determining the vertical travel, or milling depth, of the quill. By way of example, RF Rong Fu® milling machines provide a plastic assembly located on the face of the machine. The assembly comprises a housing attached to the milling machine and a moveable indicator attached to a quill shaft stop bar. The housing further has a rectangular hole which is centrally located thereon and a measurement scale surrounding the hole. As the quill is lowered and raised the indicator points to a corresponding measurement on the measurement scale, thereby informing a user of the approximate vertical movement or depth.

A disadvantage of the current measuring devices provided in milling machines is that they do not provide precise measurements. Typically, the units of measure on the devices are not small enough and one's ability to properly bore holes and mill workpieces is restricted. An example of an industry that thus is restricted is the steel industry, in which machined parts must be milled to precise tolerances. The measuring units currently provided simply do not and cannot accurately measure pieces to ensure that certain hole depths meet those tolerances. Thus, a need exists for an apparatus which provides a precise measurement of the depth or vertical movement of a quill.

Currently, there exist some measuring devices which accurately determine the vertical movement of the quill. However, for various reasons, these devices are ineffective to accomplish the objects stated herein. For example, the Mitutoyo Corporation manufactures the Digimatic Quill Kit for vertical Bridgeport® milling machines and Bridgeport® type machines. The Quill Kit essentially is a retrofitted housing comprising a main scale, a digital display indicator attached to the front surface of the main scale, a rear support plate secured to the rear of the indicator, thereby securing the indicator to the main scale, a tapped hole mounting bracket which is attached to the scale, a base, a scale stop bar that is mounted to the rear plate, a scale stop bracket and a plurality of screws and washers. The Quill Kit unit is attached to a milling machine by first retracting the spindle of the machine and removing the quill wheel. Vernier scale screws of the milling machine are removed and the base is placed over the vernier scale. The vernier screws are replaced and the mounting bracket is attached to the base. The scale is attached to the mounting bracket by the scale stop bracket.

A disadvantage of the Quill Kit is that it is only useful for Bridgeport® type machines. The device simply cannot be used on other types of milling machines, such as the RF Rong Fu® models. Moreover, the Quill Kit is comprised of many unnecessary components. As such, it is expensive to manufacture.

Stops and guides for use on drilling, depth milling and other similar machinery are known, as are quick release nuts which provide for selective sliding or threading motion with respect to a threaded shaft. Guthrie U.S. Pat. No. 4,693,656 describes such devices. Current stops, as shown by Guthrie, have a spring which presses against the end of the release nut, causing the stop to remain in place. However, such arrangement is not sufficiently tight to prevent movement of the stop on the threaded shaft or rod.

Thus, it is clear that a need exists for an inexpensive, stop which can hold be tightly when desired, and which can be provide both coarse and fine adjustments, and which is simple and versatile, and readily retrofit for use with vertical milling machines, and which is readily removable.

SUMMARY OF THE INVENTION

The present invention is a quick adjusting stop nut for selective sliding coarse adjustment and rotational precision fine adjustment for rotatable engagement with a threaded rod or shaft in close tolerances, which provides stable precision engagement with the shaft, and which provides a positive locking mechanism.

The present invention is particularly useful with a retrofit apparatus for vertical milling machines which generally comprises a mounting cover, a main scale, an indicator, a rear plate, a plurality of hat clips, a plurality of screws, a quill stop bar, a set screw, a quill stop mount and a graduated rod. The main scale is slidably attached to the rear of the indicator. The rear plate is connected to the rear surface of the indicator by a plurality of screws with the scale displaced therebetween. The mounting cover of the present invention has a generally rectangular configuration. Further, the mounting cover has a generally elongated rectangular aperture, substantially and centrally located therein. The length of the aperture extends along the length of the mounting cover face. The scale, indicator, and rear plate are secured to the face of the mounting cover by a plurality of hat clips. The components are secured so that the indicator is fixed within the aperture of the mounting cover and slidably moves in concert with the quill.

Attachment of the assembly to the quill stop bar and quill stop mount is accomplished by screwing the rear plate to the quill stop bar and inserting the quill stop bar into an aperture in the quill stop mount. A graduated rod is provided for connection to the quill stop mount, thereby allowing the slide support and scale to slidably move up and down. The entire assembly is then fixed to a milling machine by a plurality of screws which are matingly inserted into a plurality of corresponding receiving holes located on the milling machine and the left and right sides of the mounting cover.

In an alternative embodiment, the invented retrofit generally comprises a mounting cover, a main scale, an indicator, a slide support, a clamp mount, a plurality of hat clips, a plurality of screws, a quill stop bar, a quill stop mount and a graduated rod. The main scale is slidably attached to the rear of the indicator. The slide support bracket is connected to the rear surface of the scale by a plurality of hat clips and screws which partially cover the ends of the front surface of the scale. The mounting cover of the present invention has a generally rectangular configuration. Further, the mounting cover has a generally rectangular aperture, having a substantially similar configuration as the indicator, located at the bottom end of its face. The scale, indicator, and slide support are secured to the mounting cover by a clamp mount, which is disposed between the indicator and the slide support. The components are secured so that the indicator is fixed within the aperture of the mounting cover.

Attachment of the assembly to the quill stop bar and quill stop mount of the alternative embodiment is accomplished by screwing the slide support to the quill stop bar and inserting the quill stop bar into an aperture in the quill stop mount. A graduated rod is provided for connection to the quill stop mount, thereby allowing the slide support and scale to slidably move up and down. The entire assembly is then fixed to a milling machine by a plurality of screws which are matingly inserted into a plurality of corresponding receiving holes located on the milling machine and the left and right sides of the mounting cover.

In another alternative embodiment of the present invention, the retrofit comprises a mounting cover, a main scale, an indicator, a rear plate, a hat clip clamp mount, a quill stop, a mount and a quill shaft. The aperture of the mounting cover is of a corresponding size to the indicator. The main scale is slidably mounted to the indicator by the rear plate. The indicator and scale are attached to the mounting cover by the clamp mount. In addition, the indicator and scale are fixed to the quill shaft and quill stop at the mount. Subsequently, the entire assembly is joined to the milling machine by a plurality of screws which connect the two by a plurality of corresponding holes located on the milling machine and the left and right sides of the mounting cover.

In a further embodiment of the present invention, a second generally elongated aperture is present along side the first aperture. The second aperture is of a shorter length and runs parallel to the first aperture. Displaced within the second aperture is a hard stop block having a T-bolt configuration. The hard stop block has an additional lock lever which, when engaged allows a user to set the block along the second aperture at a predetermined point. In operation, the user moves the hard stop block to a desired location on the second aperture and locks it in place. Once the quill is extended, the rear plate contacts the hard stop block and resists further extension. This feature allows the user to mill multiple workpieces at a consistent depth.

Another embodiment is shown in FIGS. 24–29, which provides for one or more light assemblies to be focused on the milling head or the workpiece.

OBJECTS OF THE INVENTION

Accordingly, it as a principal object of the present invention to provide a stop nut for milling machines which accurately and tightly holds against vertical movement of a quill during operation.

A further, and more particular, object of the invention is to provide a stop nut for a threaded rod that can be adapted and retrofitted to various machines.

Another object of the invention is to provide a stop nut assembly which allows measuring the precise vertical movement of a quill or other device during operation, while holding tightly to prevent movement during operation.

Another object of the invention is to provide lighting means movable with the quill head adjacent the milling cutter.

A further object of the invention is to provide lighting means which illuminates the workpiece, and allows for replacement of bulbs.

BRIEF DESCRIPTION OF THE DRAWINGS

The foregoing and other objects will become more readily apparent by referring to the following detailed description and the appended drawings in which:

FIG. 6 is an exploded isometric view of an alternative embodiment of the housing assembly of FIG. 3;

FIG. 7 is a side view of the alternative embodiment of the housing assembly of FIG. 6;

FIG. 8 is a front view of the alternative embodiment of the housing assembly of FIG. 6;

FIG. 10 is a side view of the alternative embodiment of the housing assembly of FIG. 9;

FIG. 11 is a front view of the alternative embodiment of the housing assembly of FIG. 9.

DETAILED DESCRIPTION

Figure 1:
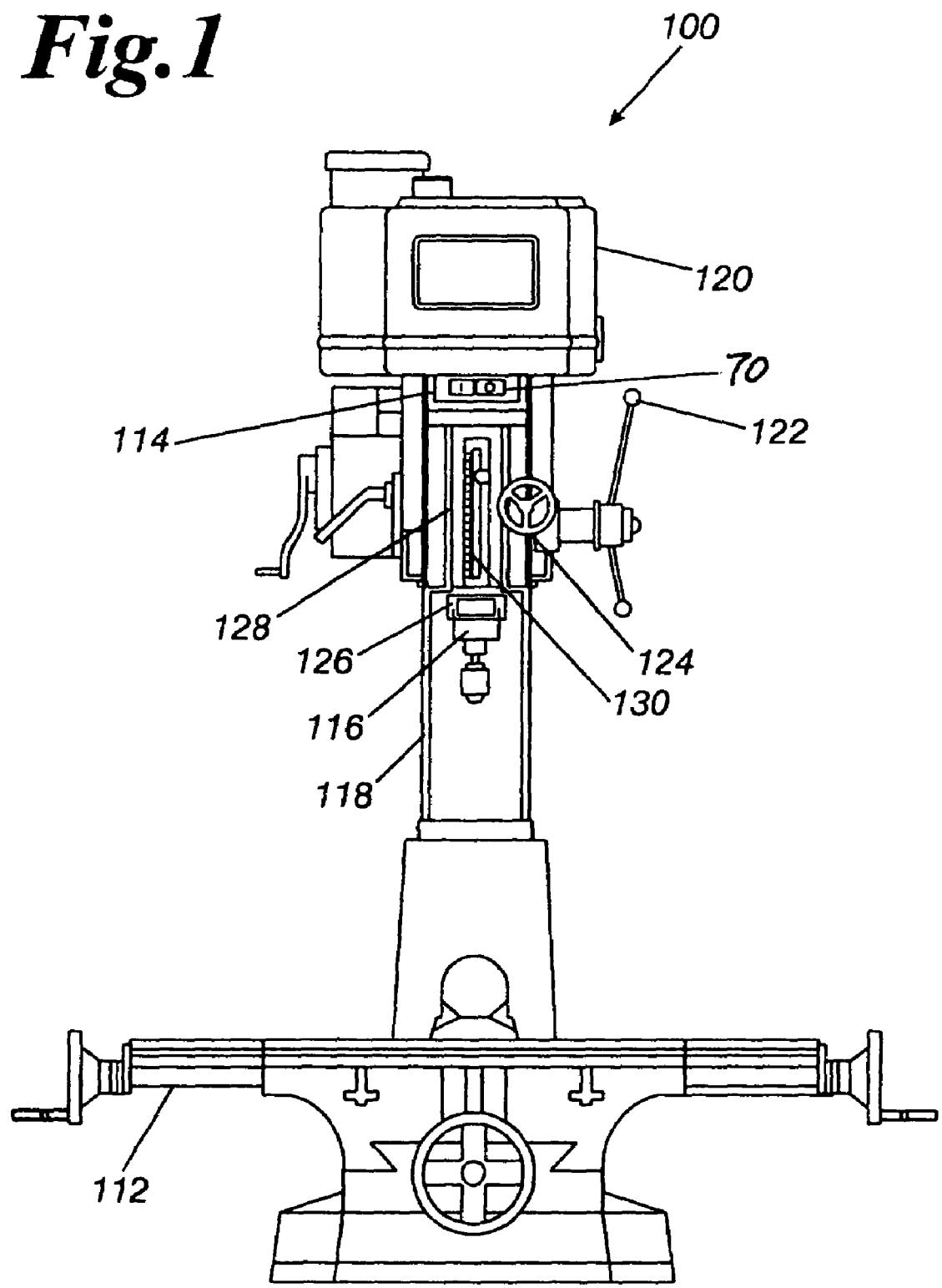
FIG. 1 is a front view of a conventional vertical milling machine, but including a circuit breaker switch.
Figure 2:
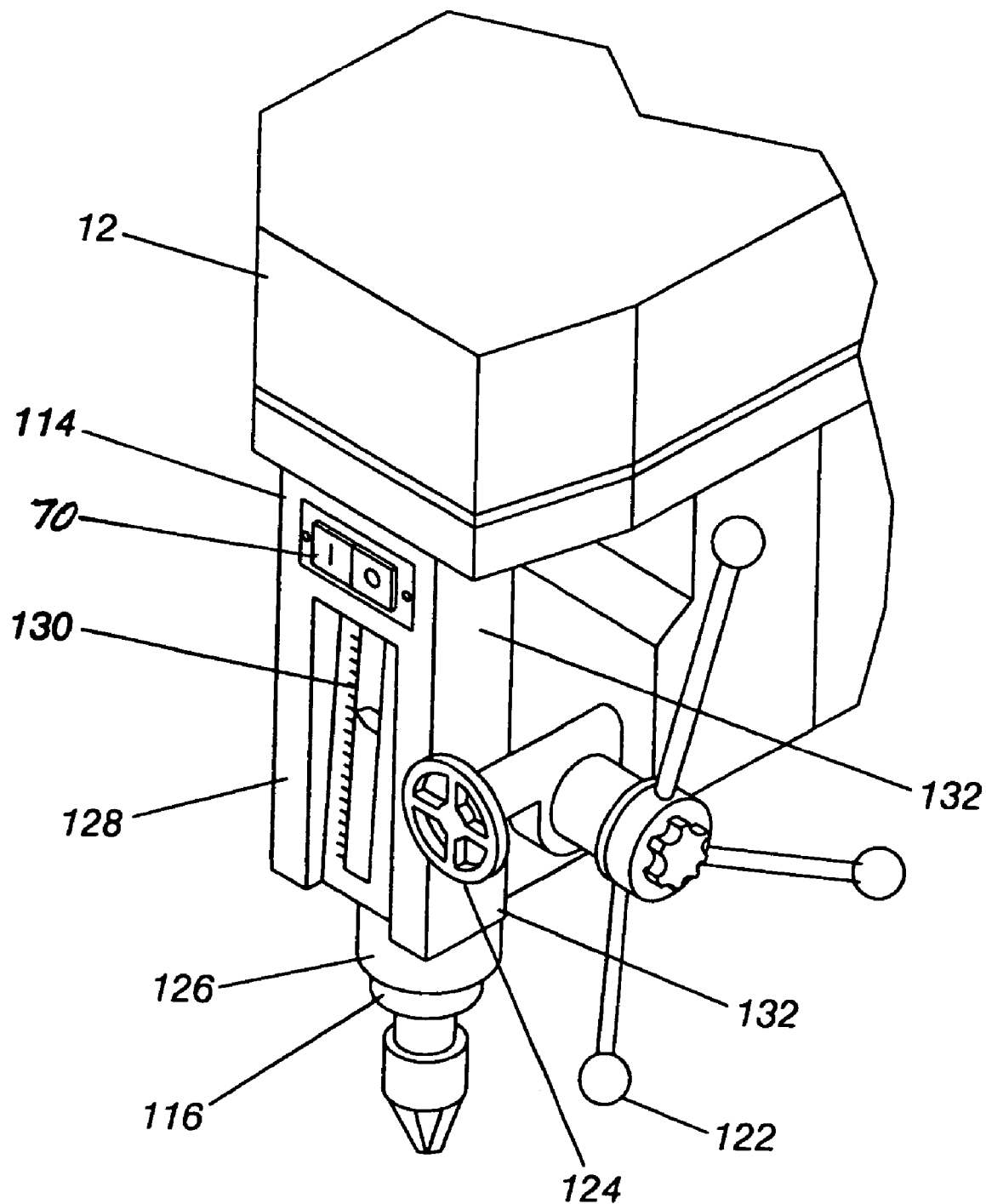
FIG. 2 is a fragmentary view of the milling machine shown in FIG. 1.

Referring now to the drawings, a conventional vertical milling machine 100 is shown in FIGS. 1 and 2, and generally includes a frame presenting a table 112 and a quill head 114 overlying the table 112, and a quill 116 supported on the head 114 for rotation and for relative shiftable movement along a central longitudinal axis thereof toward and away from the table 112 between retracted and extended positions.

The frame includes an upstanding column 118 which supports the quill 116 and head 114, and a knuckle (not shown) supported on the column 118 for pivotal movement about a transverse, horizontally extending shaft (not shown). The knuckle is secured in place relative to the column 118 by a plurality of bolts which can be loosened to enable orientation of the knuckle to be adjusted about the shaft. The head 114, in turn, is mounted on the knuckle for pivotal movement about a horizontal axis that is perpendicular to the axis of the shaft. Angular adjustment of the quill 116 about the X and Y axes can be achieved in order to orient the quill 116 at any desired angle relative to the table 112.

A motor 120 is mounted on the head 114 for driving rotation of the quill 116, and a manual feed lever 122 is connected to the quill 116 through a rack and pinion quill feed transmission so that when the lever 112 is shifted, the quill 116 is moved between the retracted and extended positions. The motor 120 is connected to the quill 116 through a suitable transmission arrangement for automatically extending the quill 116 when the transmission is engaged. The feed transmission arrangement includes a quill feed engagement control lever 124 that protrudes from a boss on the right side of the quill head 114 for permitting an operator to engage and disengage the feed transmission, as desired. A cover is normally held in place over the quill head 114 that can be removed to allow access to the transmission components within the head 114.

The feed transmission of the motor 120 includes a feed kick-out mechanism for disconnecting the quill 116 from the feed drive of the motor 120 when the quill 116 has been extended by a distance preset by the user. The feed kick-out mechanism includes a depth stop screw (not shown) supported between the quill head 114, a depth stop block received around a stop screw (not shown) and the quill 116. A travel stop ring 126 is threaded onto the stop screw for adjustment along the length thereof. When the quill feed engagement control lever 124 is moved to the engaged position, the quill 116 is moved automatically toward the extended position by the motor 120 and the depth stop block travels along the depth stop screw until the block engages the travel stop ring 126. The force of the stop block against the ring 126 trips the engagement lever 124 and the feed transmission between the motor 120 and the quill 116 is disconnected.

A scale box 128 is centrally mounted over the quill head 114 with a manual scale 130 disposed therein to allow a machinist to gauge the depth of the quill 114, and to set the position of the travel stop ring 126 so that drive to the quill 114 is disconnected at the desired depth. The scale box 128 has a generally elongated rectangular aperture for receiving the scale 130. The scale box 128 is fixed to the milling machine 100 at predetermined connection points 132. The connection points 132 are preferably threaded holes located in the milling machine 100 and are adapted to receive screws which secure the scale box 128 in place.

The vertical milling machine thus far described is a conventional knee mill, e.g. of the type manufactured by RongFu Corporation. Similar machines are made by several other manufacturers around the world, such as Bridgeport®, and the housing retrofit of the present invention can be adapted for use on any of these conventional machines without departing from the scope of the present invention. FIGS. 1 and 2 show an improvement to the conventional machines whereby a two-way or three-way circuit breaker switch 70 is provided for activating and deactivating the machine.

Figure 3:
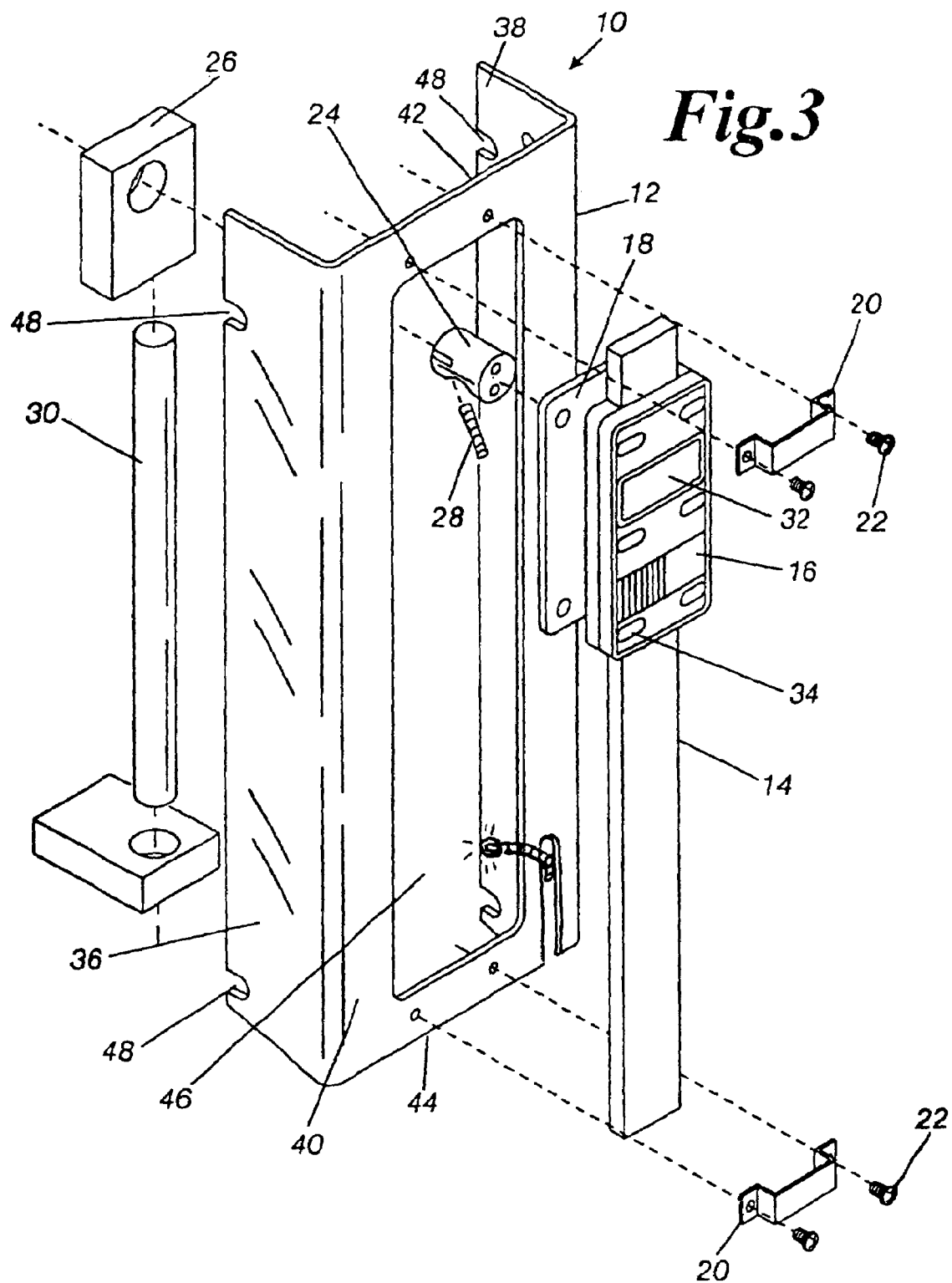
FIG. 3 is an isometric exploded view of a housing assembly of the present invention.
Figure 4:
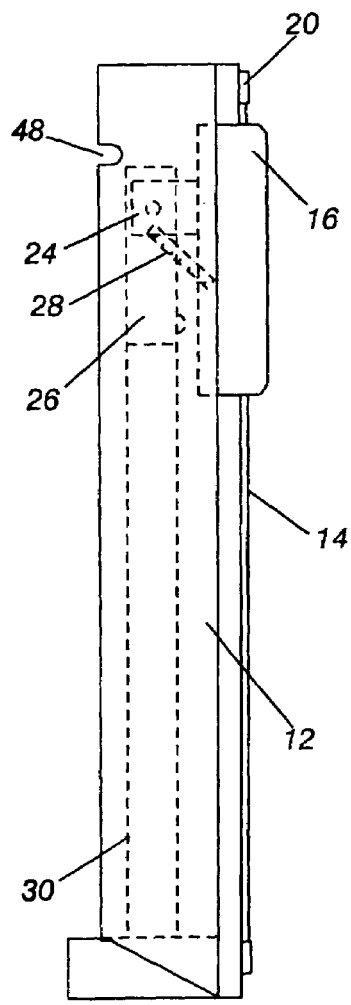
FIG. 4 is a side view of the invented housing assembly of FIG. 3.
Figure 5:
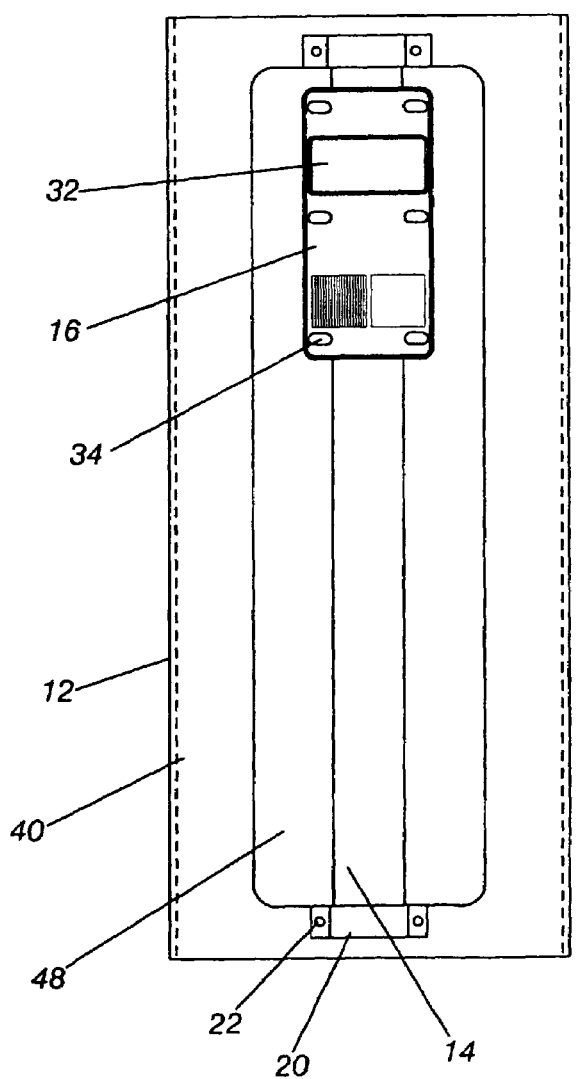
FIG. 5 is a front view of the invented housing assembly of FIG. 3.

FIGS. 3–5 show a preferred embodiment of the invented retrofit apparatus 10. The retrofit apparatus 10 generally comprises a mounting cover or housing 12 having a generally rectangular face configuration, a main scale 14, an indicator 16, a rear indicator plate 18, a plurality of hat clips 20, a plurality of screws 22, a cylindrical quill stop bar 24, a quill stop mount 26 which is adapted to receive the quill stop bar 24, a set screw 28, and a cylindrical graduated rod 30.

The included indicator 16 is a digital displacement indicator. An example of the indicator is such as that produced by the Mitutoyo Corporation for indicating the depth of holes, slots and countersinks. The indicator 16 generally includes an indicator head having a digital readout 32 and a plurality of control buttons 34. The indicator 16 further includes an attachment means whereby it can be secured to the main scale 14 by attachment screws (not shown). While the Mitutoyo Corporation device is stated as an exemplary model which may be used in the present invention, other suitable digital displacement indicators may be used.

The mounting cover 12 is preferably made of aluminum or steel and has a left side 36, a right side 38, a face 40, a top end 42 and a bottom end 44. The mounting cover 12 may be made of other suitable materials which can accomplish the objects stated herein. Further, the face 40 of the mounting cover 12 has a generally rectangular aperture 46 located therein. The aperture 46 of the face 40 has a width corresponding to that of the indicator 16. However, the length of the aperture 46 substantially extends to the top and bottom ends 42 and 44 of the mounting cover 12, thereby allowing the indicator 16 to slidably move along the scale 14. Located on the mounting cover's left and right sides, 36 and 38 respectively, are attachment notches 48 for attaching the retrofit apparatus 10 to a milling machine 100.

The main scale 14 has a generally elongated rectangular configuration and is formed so that the indicator 16 can be slidably mounted thereto. The scale 14 is secured to the outer surface of face 40 of the mounting cover 12 by the plurality of hat clips 20. Further still, the indicator 16 is slidably mounted to the scale 14 by the rear plate 18. Attached to the rear plate 18 at one end is the quill stop bar 24 which is matingly engaged with the quill stop mount 26 at its opposing end. The quill stop mount 26 is adapted to receive the cylindrical graduated rod 30.

After the scale 14 and indicator 16 are attached to the mounting cover 12, they are attached to the quill stop bar 24 via the rear plate 18. The quill stop bar 24 is, in turn, matingly connected to the quill stop mount 26 at the upper end of its front surface. The quill stop bar 24 is secured in place by the set screw 28 which is received in an angular cavity located on the stop bar 24. The graduated rod 30 is also matingly connected to the quill stop mount 26 at its bottom surface. The retrofit apparatus 10 is fixed to the milling machine 100 by a plurality of screws (not shown) which connect the two by predetermined connection points 132 located on the milling machine 100 and the left and right sides, 36 and 38, of the mounting cover 12. A mounting slot 72 may be provided in mounting cover 12 at any convenient or desired location for receiving an mounting a light 74 thereto. The light is preferably a flexible extended light or flexible neck light, so that it can be directed toward the work. When the quill moves up or down, light 74 moves with it.

Figure 27:
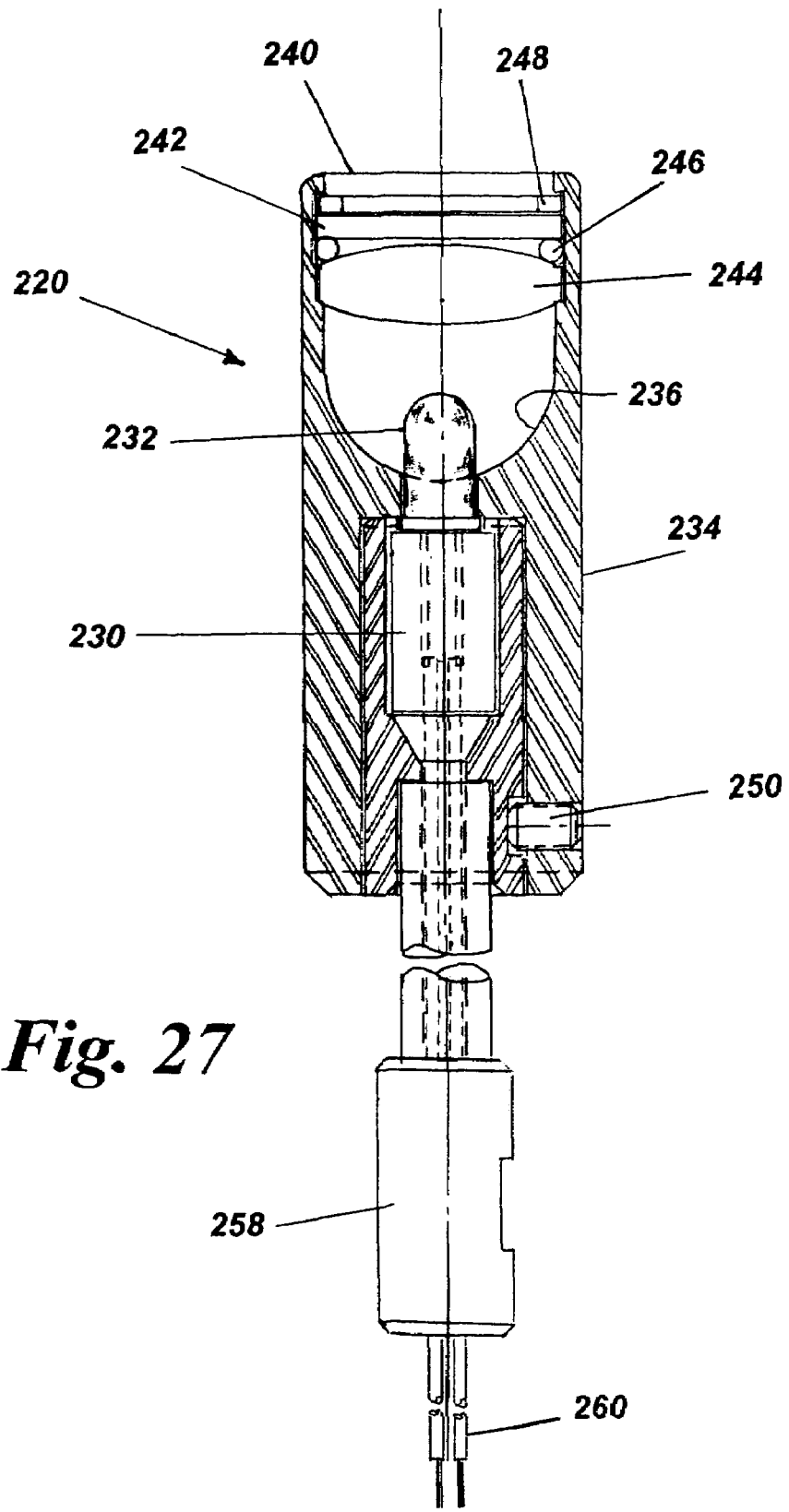
FIG. 27 is a cross-sectional view of an alternative light assembly, which is readily adaptable to a quill in accordance with the invention.
Figure 29:
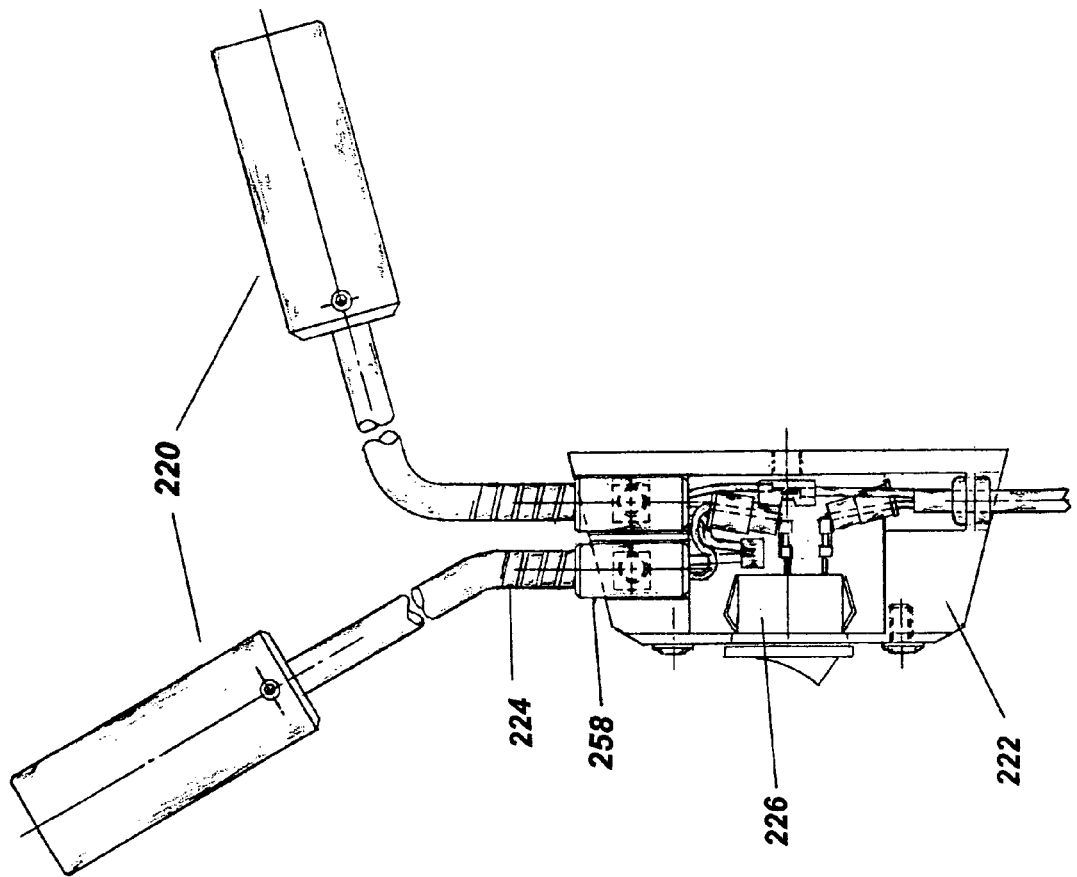
FIG. 29 is a cross sectional view of the light switch assembly taken along line A—A.
Figure 28:
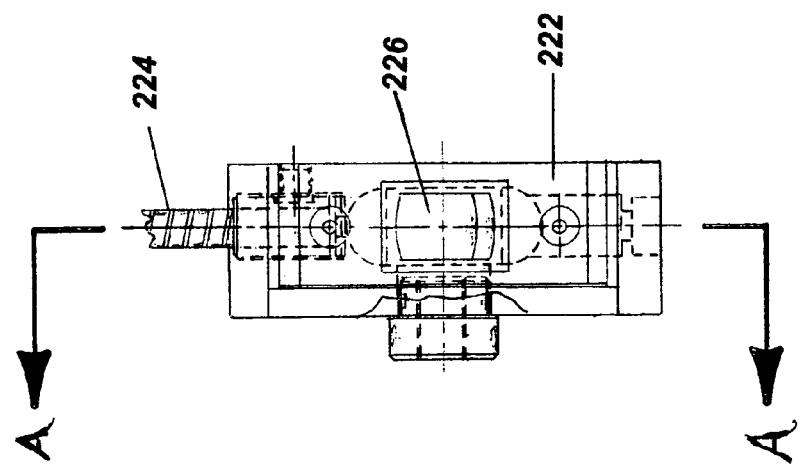
FIG. 28 is a front view of a light switch assembly mounted on a quill for activating one or more lights of a light assembly.

An alternative light assembly 220 is shown in FIG. 27. The light assembly has a power source shown as a flexible wire 224 in a flexible tubing (known as a "flex-stay" tubing) which is connected to a switch 226 in a switch assembly 222 which is mounted on the quill 116. The light assembly 220 has an interior housing 228 containing a bulb receptacle 230 for accommodating one or more light emitting diodes 232 (LEDs), referred to hereinafter as LEDs or bulbs. An exterior housing 234 surrounds the interior housing and the bulb receptacle. A parabolic reflector 236 is advantageously positioned within the exterior housing for directing the light from the bulb. The end 240 of the exterior housing from the which the light is emitted has a tempered glass cover 242 to protect a lens, the cover being resistant to scratching. A focusing lens 244 is mounted within the housing 234, beneath and spaced from the cover. The lens 244 is preferably glass or plastic, but could be any other desired material, such as quartz or mica. A rubber or neoprene separator 246 between the lens and the cover acts as a washer or seal to waterproof the light housing, and prevent water, oil, or any other liquid from entering the light assembly. The cover 242 is held in place against the seal 246 by a retainer 248 such as a spring-type retaining ring.

The external tubular housing 234 is removable from the light assembly, and is held in place by any convenient means such as setscrew 250. The external tubular housing 234 is preferably metal, such as aluminum or steel, or alternatively made of high impact plastic. Removal of the external housing allows access to the bulb 232 and replacement of the bulb when it burns out.

Wire 260 leading to the light housing is coiled as shown within the quill housing, to allow movement of the light assembly with the quill 116. Between the quill housing and the light housing, the wire is encased in flexible tubing, which allows it to be positioned, and to hold any desired position. The LED lamp works off of 120v, 220/240v, or 440/480v single phase and 3-phase that is convertible to 24v or less direct current without the use of batteries. A transformer accomplishes the voltage conversion.

Being affixed directly onto the quill 116 through a transition fitting 258, the LED lamp continuously brightens the work area of the machine tools and surface of the part being machined by being properly directed. The light moves up and down with the machine tool.

The flexible tubing with the associated LED lamp gives the machine operator a large range of area for focusing the lamp beam onto the machine surface, workpiece, and tool. For the LED, the voltage must be converted to 12–24 volts. The higher voltage provides a brighter light.

The following voltages are commonly used with milling machines, and the present invention is adaptable to be used with any of them:
  120 V AC-3 phase
  120 V AC-single phase
  220/240 V AC-single phase
  220/240 V AC-3 phase
  440/480 V AC-3 phase In operation, as a drill feed control lever 124 on the milling machine 100 is actuated, the quill 116 is vertically lowered to a workpiece on the table 112 and the indicator 16 positively and precisely measures the vertical travel, or depth, of the movement and digitally displays the unit of measure. Once the quill 116 is lowered to a predetermined depth limit, the quill stop bar 24 prevents further downward movement.

Referring to FIGS. 6–8, an alternative embodiment of the retrofit apparatus 10 is shown. The retrofit 10 comprises a mounting cover 12 having a left side 36, a right side 38, a face 40, a top end 42 and a bottom end 44. Again, the mounting cover 12 has a generally rectangular configuration and is preferably comprised of aluminum or steel. However, other, similar materials may be employed. Further, the face 40 has a generally rectangular aperture 46 located at the bottom end 44 of the mounting cover 12. The retrofit 10 further comprises a main scale 14, an indicator 16, a hat clip clamp mount 50, a cylindrical quill stop 24, and a stop mount 26. The aperture 46 in face 40 is of a corresponding size to the indicator 16.

Similar to the first embodiment, the main scale 14 is a generally rectangular device formed so that the indicator 16 can be slidably mounted to the front surface thereof. The indicator 16 is slidably attached to the scale 14 and held in place by the hat clip mount 50. The indicator 16 and scale 14 are attached to the mounting cover 12. In addition, the upper end of the scale 14 is fixed to the front surface of the quill stop bar 24 by a face mount 52. Preferably, the face mount 52 is attached to the quill stop bar 24 by a screw, however, it will be appreciated that other attaching devices may be used. Again, the quill stop bar 24 is held in place by the set screw 28.

Subsequently, the entire retrofit assembly 10 is joined to the milling machine 100 by a plurality of screws which connect the connection points 132 located on the milling machine 100 and the notches 48 of the left and right sides, 36 and 38 respectively, of the mounting cover 12.

Figure 9:
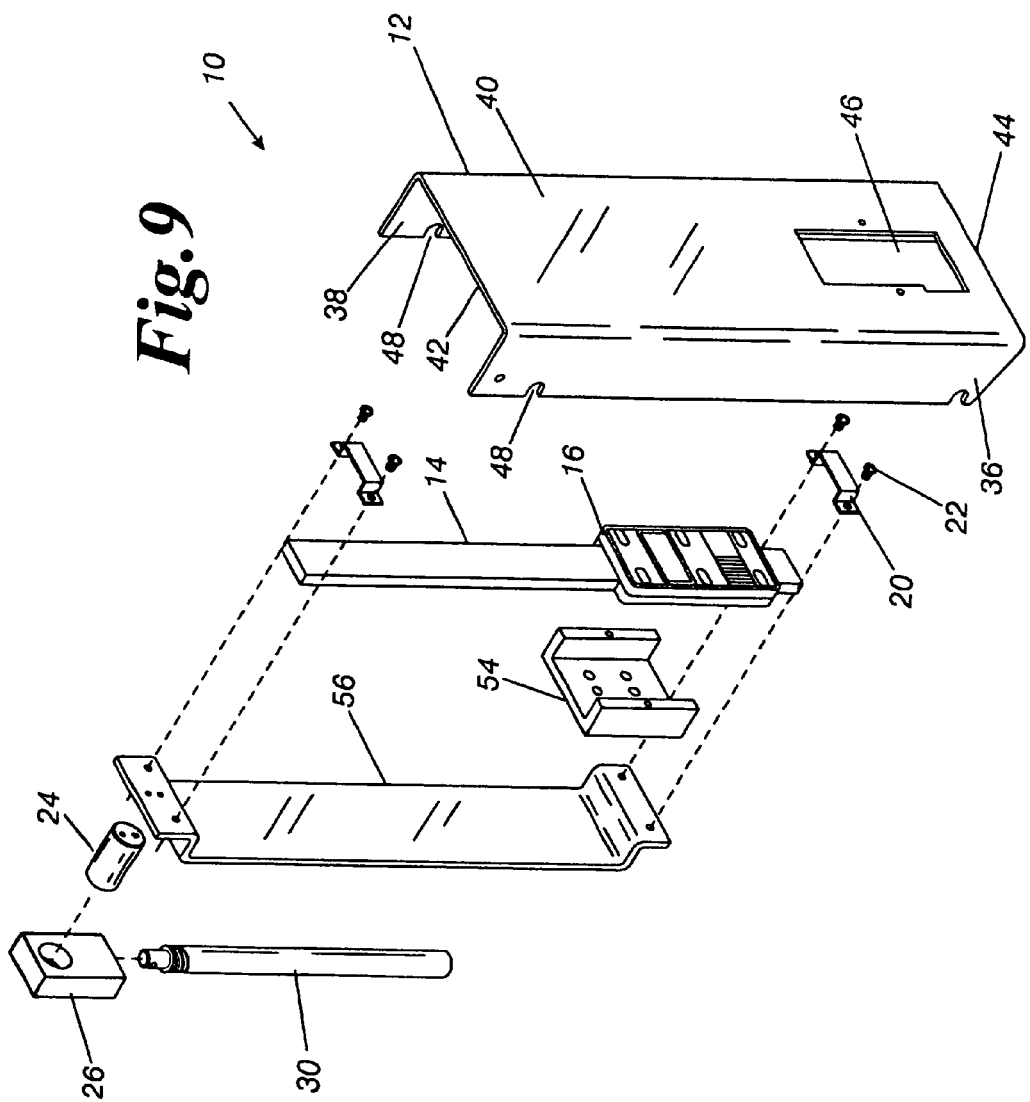
FIG. 9 is an exploded isometric view of another alternative embodiment of the housing assembly of FIG. 3.

Another alternative embodiment of the retrofit 10 is shown in FIGS. 7 through 9. In this alternative embodiment, the retrofit apparatus 10 comprises a mounting cover 12 having a generally rectangular configuration, a main scale 14, an indicator 16, a slide support 56, a clamp mount 54, a plurality of hat clips 20, a plurality of screws 22, a cylindrical quill stop bar 24, a quill stop mount 26 which is adapted to receive the quill stop bar 24 and a cylindrical graduated rod 30.

Again, the indicator 16 generally includes an indicator head having a digital readout 32 and a plurality of control buttons 34. The indicator 16 further includes an attachment means whereby it can be secured to the main scale 14 by attachment screws. Further, the mounting cover 12 generally has a left side 36, a right side 38, a face 40, a top end 42 and a bottom end 44. The face 40 of the mounting cover 12 has a generally rectangular aperture 46 located toward the bottom end 44. The aperture 46 in the face 40 is of a corresponding size to the indicator 16. Located on the left and right sides, 36 and 38 respectively, are attachment notches 48 for attaching the retrofit apparatus 10 to the milling machine 100.

The main scale 14 has a generally rectangular configuration and is formed so that the indicator 16 can be slidably mounted thereto. The slide support 56 has a substantially hat clip configuration and has a corresponding length to the scale 14. However, the slide support 56 has a greater width than the scale 14, thus allowing the scale 14 and indicator 16 to be fixed thereto by the plurality of hat clips 20 and screws 22. Disposed between the slide support 56 and the indicator 16 is the clamp mount 54. The indicator 16, scale 14, and slide support 56 are attached to the mounting cover 12 by the clamp mount 54 so that the indicator 16 is fixed within the aperture 46 of the mounting cover 12.

After the scale 14 and indicator 16 are attached to the mounting cover 12, they are attached to the quill stop bar 24. The quill stop bar 24 is, in turn, matingly connected to the quill stop mount 26 at the upper end of its front surface. The graduated rod 30 is also matingly connected to the quill stop mount 26 at its bottom surface. The retrofit apparatus 10 is then fixed to the milling machine 100 in the manner previously described.

Figure 12:
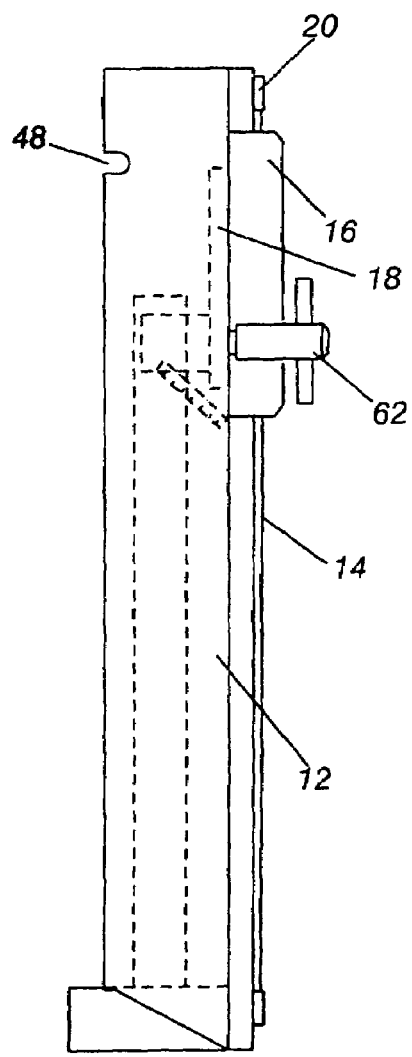
FIG. 12 is a side view of a further alternative embodiment of the housing assembly of FIG. 3.
Figure 13:
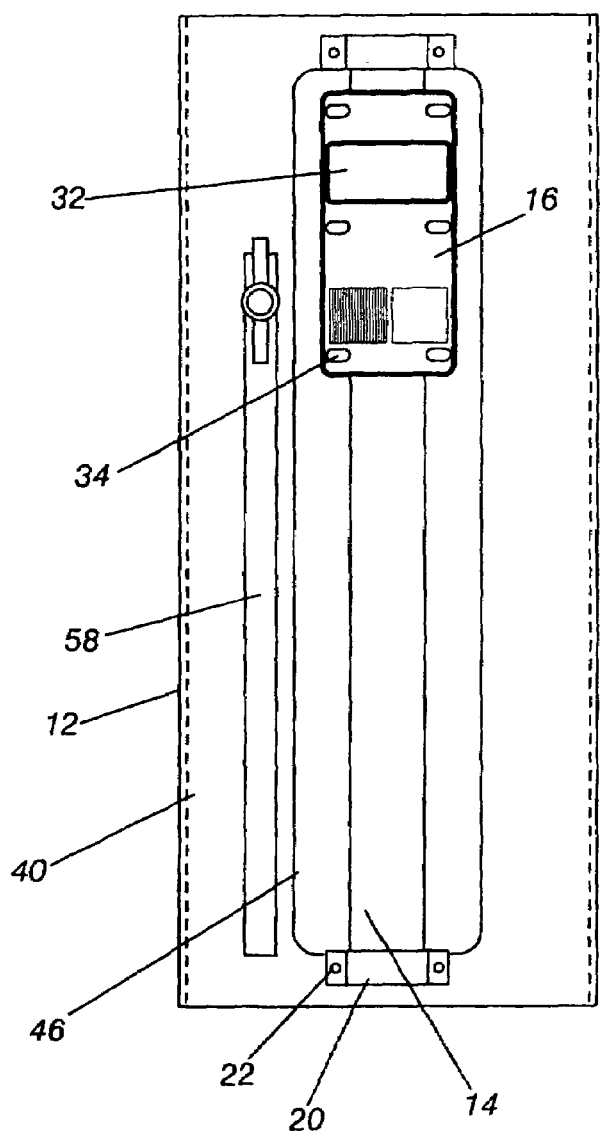
FIG. 13 is a fragmentary side view of the alternative embodiment of the housing assembly of FIG. 12.
Figure 14:
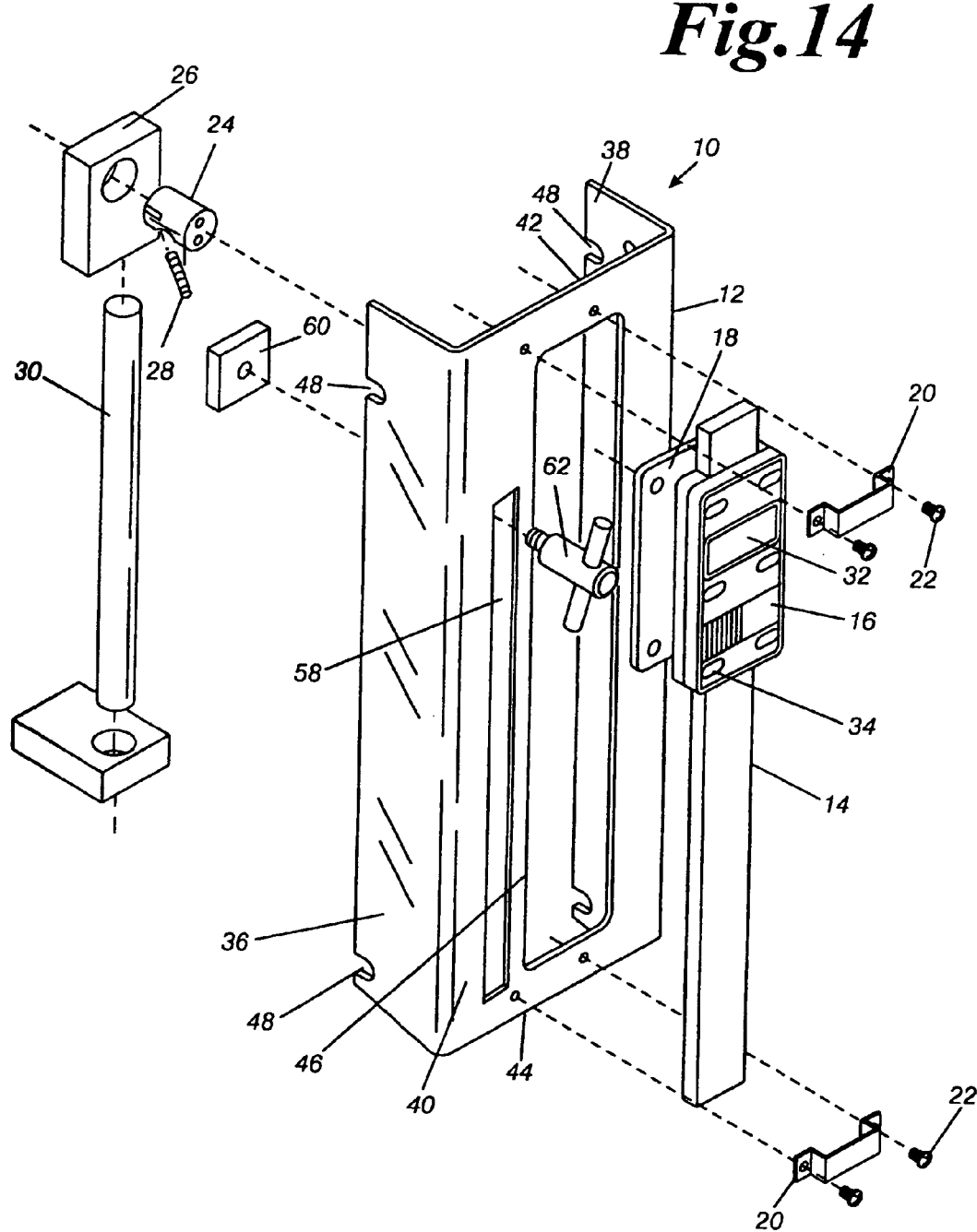
FIG. 14 is an exploded isometric view of the alternative embodiment of the housing assembly of FIG. 12.

Referring to FIGS. 12–14, another embodiment of the present invention is shown. In this embodiment, a second generally elongated aperture 58 is present along side the aperture 46. The second aperture 58 is of a shorter length and runs parallel to the aperture 46. Displaced within the second aperture 58 is a hard stop block 60 having a T-bolt configuration. The hard stop block 60 has an additional lock lever 62 which, when engaged allows a user to set the block 60 along the second aperture 58 at a predetermined point. In operation, the user moves the hard stop block 60 to a desired location on the second aperture 58 and locks it in place by engaging the lock lever 62. Once the quill 116 is extended, the rear plate 18 contacts the hard stop block 60 and resists further extension. This feature allows the user to mill multiple workpieces at a consistent depth.

Figure 22:
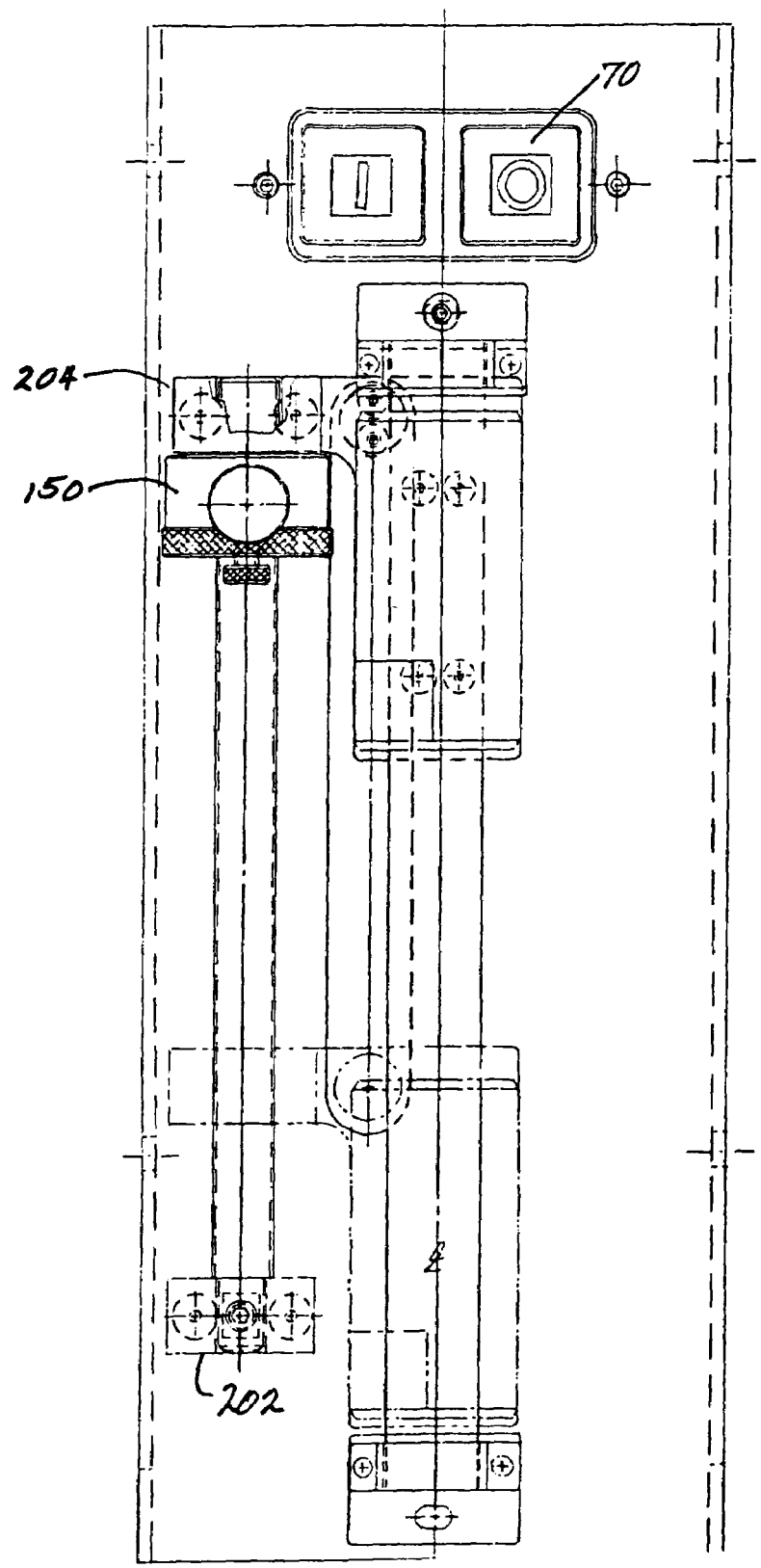
FIG. 22 is a partial view of a milling machine showing the stop nut assembly installed thereon.
Figure 23:
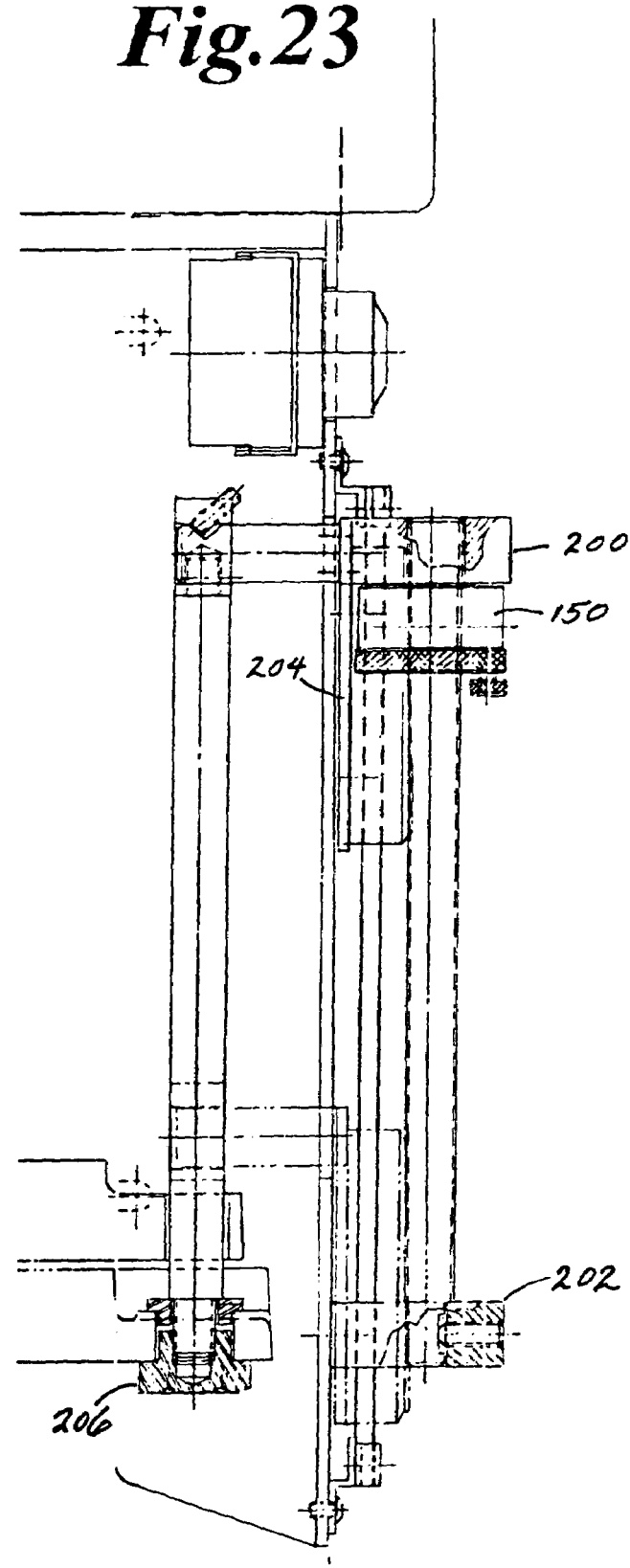
FIG. 23 is a partially sectioned side view of FIG. 22.
Figure 24:
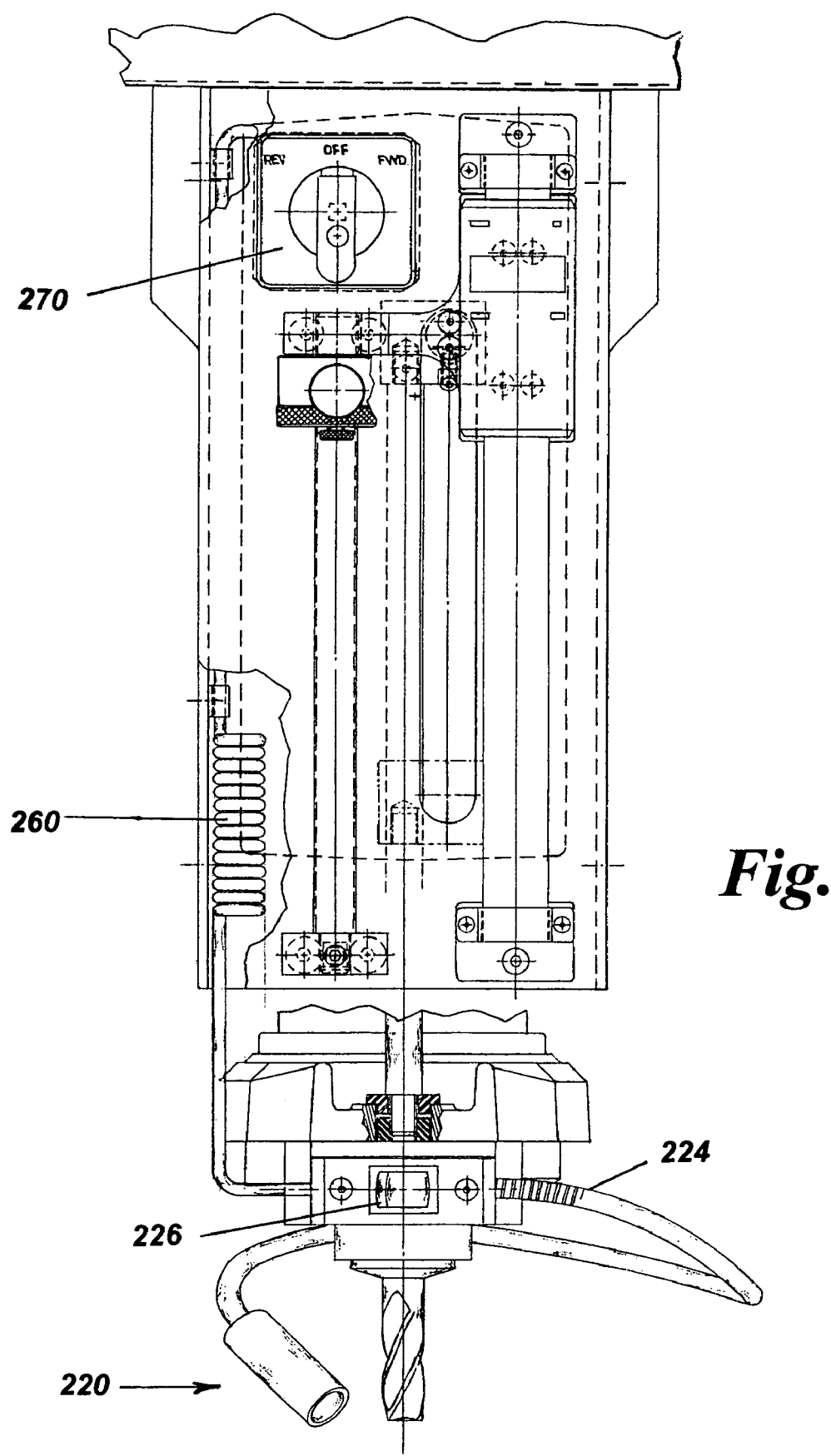
FIG. 24 is a partially cutaway front view of a milling machine showing another alternative embodiment of a retrofit assembly.
Figure 25:
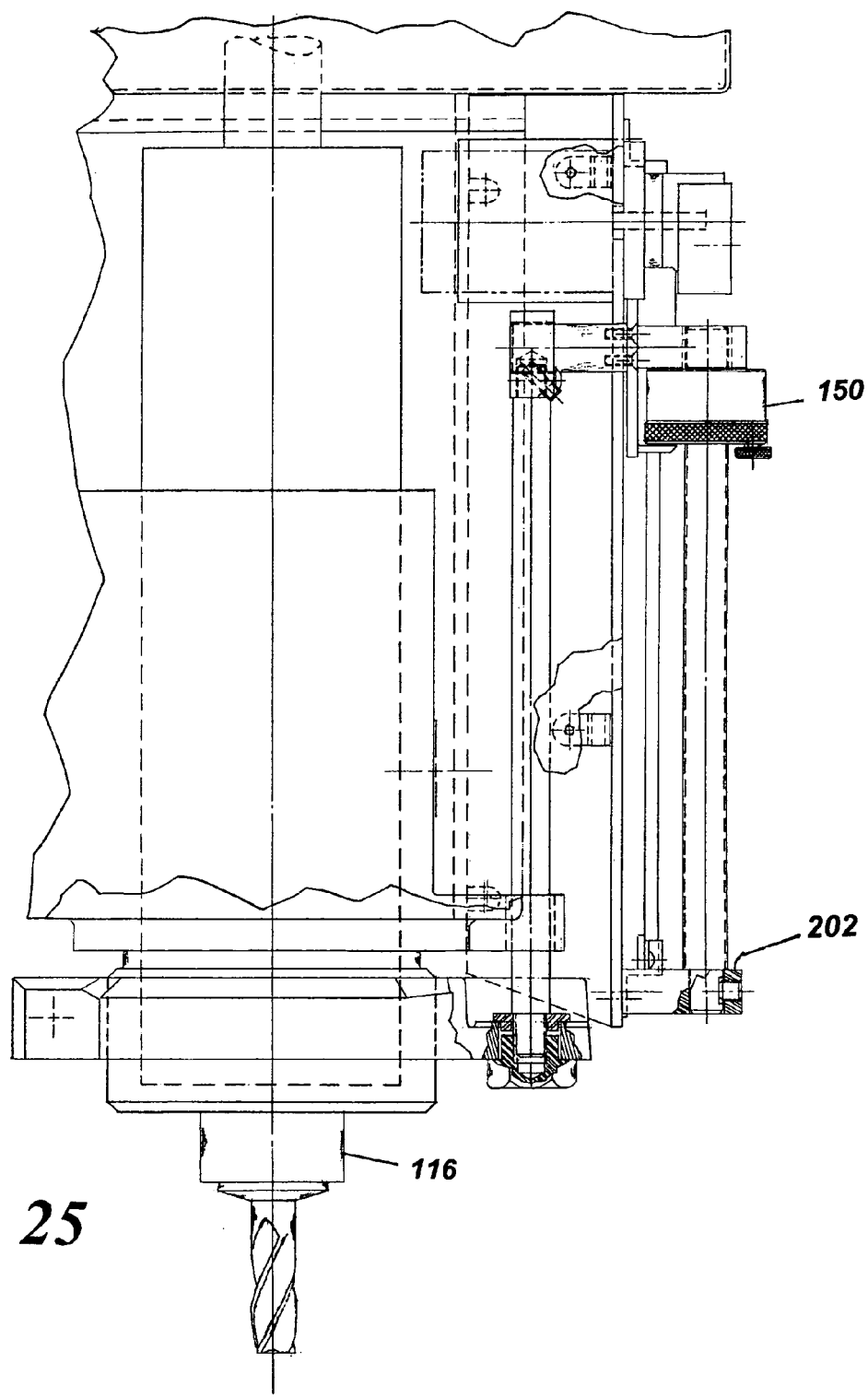
FIG. 25 is side view of the embodiment of FIG. 24.
Figure 26:
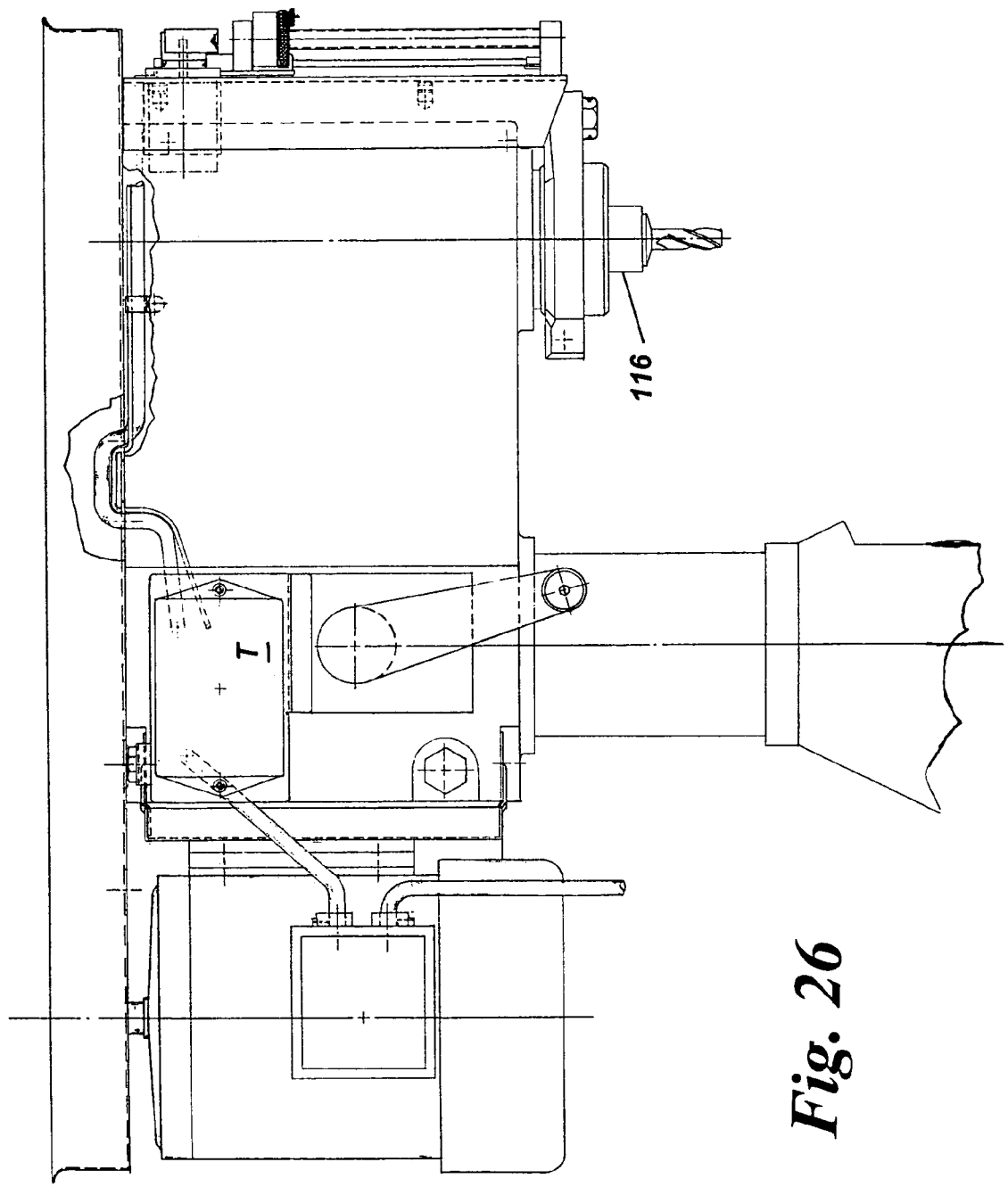
FIG. 26 is a side view of a milling machine incorporating the embodiment of FIGS. 24 and 25 therein.

FIGS. 22 and 23 show sliding stop plate 200 attached to the digital indicator, and fixed plate 202. Finished cap nut bushing 206 is installed at the end of the quill. The digital displacement indicator 16 is mounted on a mounting plate 204 which transmits motion around the threaded rod to which the stop nut 150 is connected. While one end of the threaded rod is firmly attached to a fixed mount 202 attached to the cover, the motion of the digital displacement indicator can be stopped or adjusted with the stop nut 150. Mounting plate 204 is of sufficient length to overlap both ends of the indicator 16 and provide protection thereto from damage.

The invented quick adjusting nut 150 includes a nut body 152, a depressable plunger 154, and a biasing mechanism, such as a compression spring 156.

Figure 15:
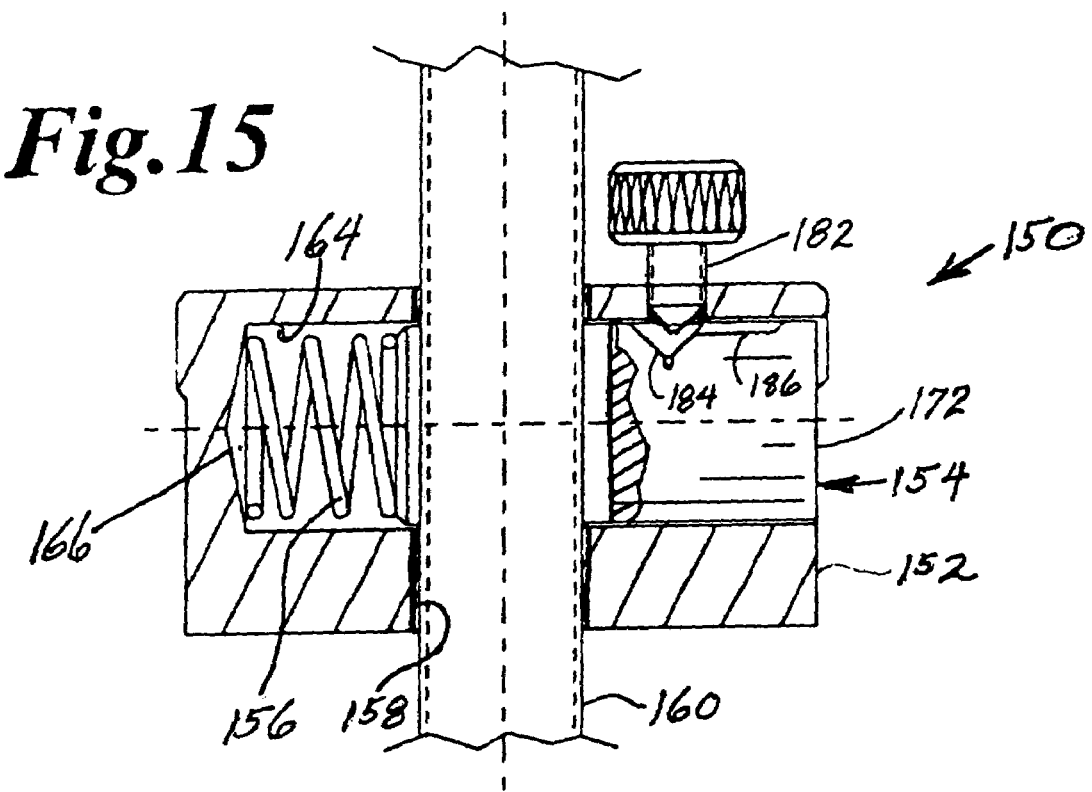
FIG. 15 is a cross-sectional view of the invented stop nut assembly.
Figure 16:
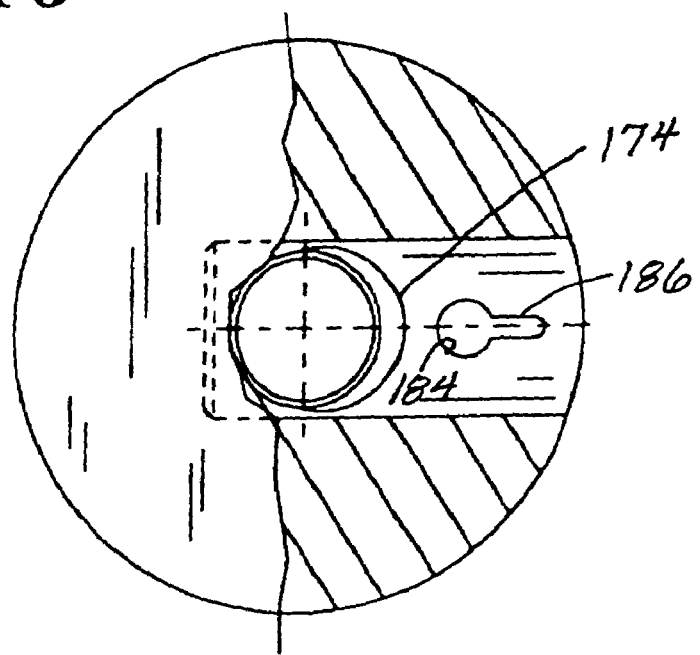
FIG. 16 is a partially cutaway view of the stop nut assembly of FIG. 15.
Figure 17:
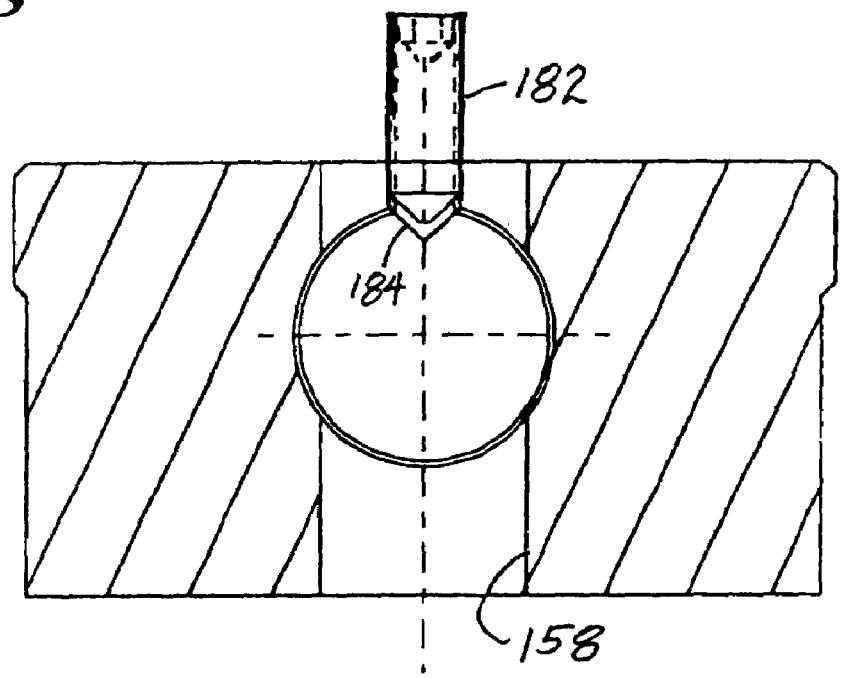
FIG. 17 is a cross-sectional view of the stop assembly showing a stop mechanism.
Figure 18:
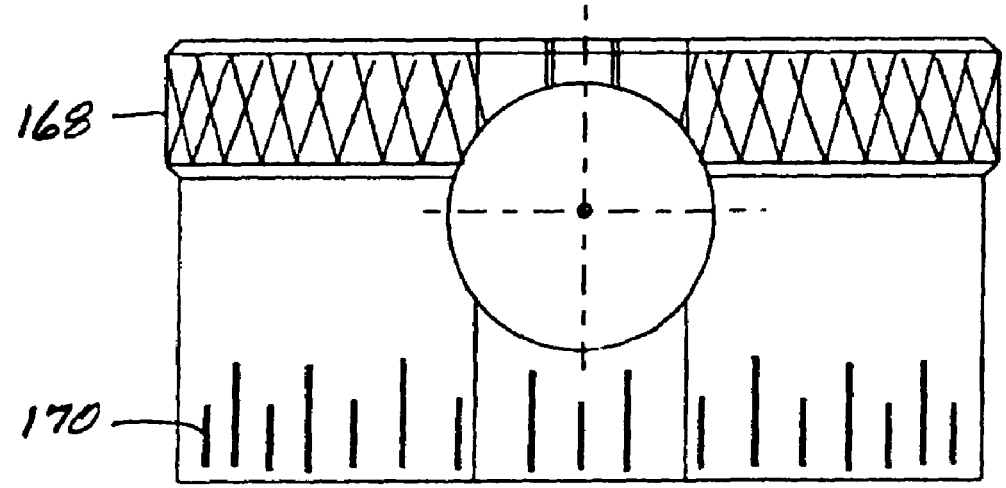
FIG. 18 is a schematic right side view of the stop assembly of FIG. 15.

As best seen in FIGS. 15 and 16, nut body 152 includes an axial bore or passageway 158 adapted to receive a threaded rod or shaft 160. Axial bore 158 is suitably centrally located through nut body 152. In addition, a transverse bore or socket 164 extends radially inward from one exterior point across the diameter of nut body 152 communicating with axial bore 158 and terminating at an end 166 in the opposite half of body 152 beyond the axial bore. Socket 164 may have a tapered end 166, as shown in FIG. 15, or it may have a flat end.

Nut body 152 may include a knurled end portion 168 for easy handling. The nut body 152 can also be provided with an upper graduated portion 170, including any desired number of precision graduations.

Axial bore 158 is centrally disposed, extending through the nut body 152. The diameter of axial bore 158 is selected to closely receive rod 160, permitting sliding in an axial direction, but relatively little lateral motion.

Figure 21:
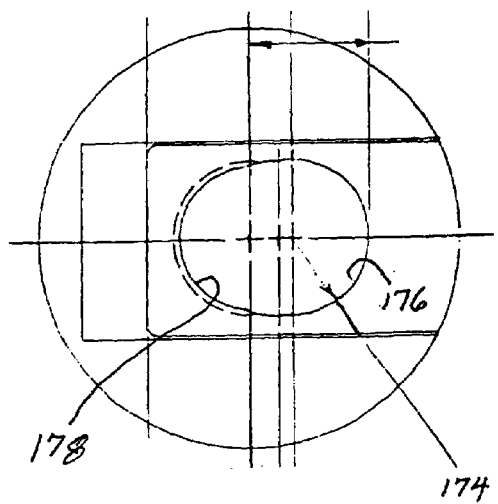
FIG. 21 is shows the offsets of the two bores in the plunger.

Plunger 154 is adapted to be slidably received in transverse bore 164, and has an outer end 172 accessible from the body exterior. Plunger 154 includes a transverse aperture 174 defined by two slightly offset bores 176 and 178 (see FIG. 21). Unthreaded bore 176 is disposed nearest the end 172 of plunger 154, and is of a larger diameter than bore 178. It is suitably of slightly larger diameter than nut body axial bore 158 (e.g., 0.505 to 0.510 inch diameter). Smaller bore 178 is suitably offset from bore 176 by approximately 0.085 to 0.075 inch, and is of a diameter commensurate with that of threaded rod 160, and is threaded in a manner suitable for threaded engagement or mating with the threads of rod 160.

Plunger 154 is received in nut body transverse bore 164 so that aperture 174 is in general registry with nut body axial bore 158. Nut body axial bore 158 and plunger aperture 174 are adapted to cooperatively receive threaded rod 160. Biasing means such as spring 156 is placed in the terminal end 166 of nut body transverse bore 164 so that the compressive spring forces will operate in the axial direction of nut body transverse bore 164, and, in the absence of external compressive force, will push threaded bore 178 into threaded engagement with rod 160.

The quick adjusting nut 150 is easily placed in an operative condition on rod 160. The nut is assembled, plunger 154 is depressed, and the nut 150 is mounted onto threaded rod 160 by sliding rod 160 through nut body axial bore 158 and plunger aperture 174.

Coarse positioning of nut 150 is quickly and efficiently achieved by depressing plunger 154 to release the nut, and axially sliding nut 150 to the approximate desired location on rod 160, as determined by visual coordination with machine mounted scale 21. More particularly, depressing plunger 154 inwardly in a radial direction compresses spring 156, and displaces plunger aperture 174 from the spring biased (engaged) position with respect to rod 160. Rod 160 is thus disengaged from threaded bore 178 and is received in the larger diameter bore 176 of plunger aperture 174 to permit the axial sliding of nut 150 with respect to the threaded rod or shaft 160. Plunger 154 is then released, whereby spring 156 biases the smaller threaded bore 178 of the plunger aperture 174 into threaded engagement with the threads of rod 160.

Plunger aperture 174 is formed with offset bores 176 and 178 of differing diameters. By using a smaller threaded bore of a diameter corresponding to that of rod 160, nearly a full 180 degrees of threaded engagement between nut 150 and rod 160 is provided during thread engagement. Further, the relatively close reception of rod 160 by nut axial bore 158, and the extended length of the axial bore help to effectuate a secure threaded engagement.

Final securing of the stop nut 150 is by a set screw 182 which extends through the face 180 of the nut body 152. A cooperating recess 184, which is preferably conical is provided in the plunger. The set screw presses against the edge of the conical recess farthest from the spring in a cam-type action, effectively tightening the clamping effect of the threads of bore 178 of the plunger against the threads of the rod 160. This has been found to be sufficiently tight to prevent movement of the nut under all normal operating conditions.

A slot 186 of lesser depth than the recess 184 is advantageously positioned in plunger 154 adjacent to and communicating with recess 184 to allow longitudinal movement of the plunger without complete removal of the set screw 182.

Figure 19:
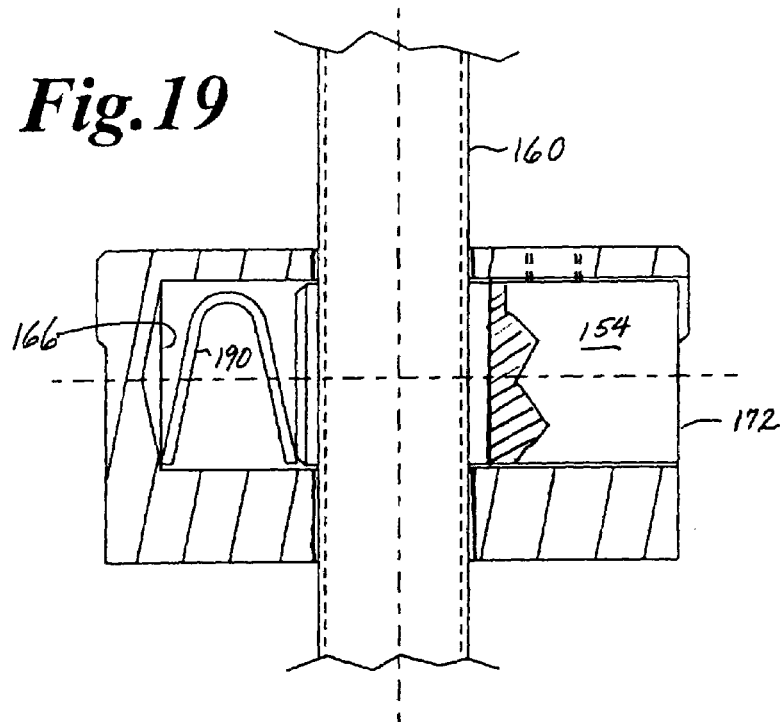
FIG. 19 is a cross-sectional view of the invented stop assembly of FIG. 15 showing an alternative spring biasing means.
Figure 20:
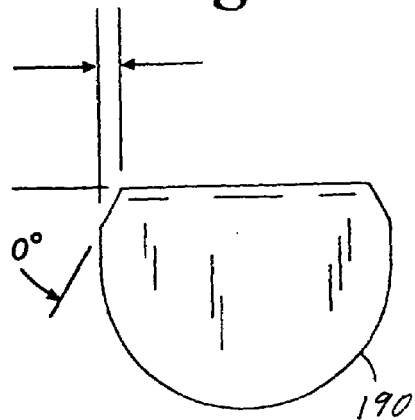
FIG. 20 is a left side view of the spring of FIG. 19.

Any biasing means can be substituted for spring 156. A suitable biasing means is a leaf spring 190 as shown in FIGS. 19 and 20. Note that this requires a slight modification to the spring so that it will fit into the bore 152. Advantageously, the leaf spring is welded to the end of the plunger.

Precision adjustment is achieved by rotating the nut 150 about rod 160 as desired, and is facilitated by graduation portion 170 of nut body 152.

The nut is shown as round in FIG. 16, however, it can have a generally square or hexagonal configuration, if desired.

The set screw 182 can have a knurled head for hand tightening, or it can have a recessed head for an Allen wrench, or it can have a square or hexagonal head for engagement by a mating wrench.

The stop nut can be made of any desired material, including steel, stainless steel, brass, or aluminum. If steel, it can be black oxide or phosphate coated. If aluminum, it can be anodized, and can be made in different colors. If brass, it can be copper plated or chrome plated.

It should be appreciated that the present invention provides a particularly useful device. For example, when used in a machine shop wherein about 20 quick stop adjustments are required per day, a nut 150 in accordance with the present invention will save several man hours per month, as compared to conventional adjustment mechanisms. Further, a very tight and secure engagement between nut 150 and rod 160 is provided, which is not susceptible to undesired slippage due to vibration, nor is it susceptible to jamming.

A rotary cam selector switch 270, available from BACO Controls, Inc., of Cazenovia, N.Y., is provided at or near the top of the retrofit assembly. This three-way switch provides Forward, Reverse, and Off settings on the same switch, which is small and compact. Most motors do not have a motor switch, but need a power switch to control the power to the motor switch. A pilot switch can be used where the motor has a motor switch. The 3-way switch 270 allows all of the current to move through it without requiring a motor switch. The advantage is that it is not necessary to modify the digital quill system to use different switches or different motors. For instance, in the invented system, a mill drill can use a 1 horsepower, a 1.5 HP, or a 2 HP motor without changing the switch.

While the present invention is described in connection with milling machines, it has advantageous application with other machines such as drill presses, and on any threaded drive where it is desired to stop motion precisely.

SUMMARY OF THE ACHIEVEMENT OF THE OBJECTS OF THE INVENTION

From the foregoing, it is readily apparent that I have invented a retrofit apparatus for economically measuring the vertical movement of a quill during operation, as well as a stop nut for milling machines which accurately and tightly holds against vertical movement of a quill during operation, which stop nut can be adapted and retrofitted to various machines having a threaded drive where it is desired to stop motion precisely.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A retrofit apparatus for measuring the vertical displacement of a quill on a milling machine having:
    a main scale slidably mounted to an indicator, said indicator being capable of displaying the vertical displacement of the quill of the milling machine;
    a mounting cover having a generally rectangular configuration and an aperture located therein for receiving said indicator;
    a stop bar fixedly secured to said scale by an attachment means;
    said quill having a quill shaft attached thereto;
    said quill shaft being matingly engaged to said stop bar by a quill mount; and
    wherein the quill shaft moves vertically responsive to a force placed thereon, thereby causing said scale to slide up and down along the indicator;
    a stop nut assembly for a threaded rod, comprising: a nut body having a face and an axial bore therethrough adapted to receive a threaded rod, said nut body being provided with a transverse bore terminating in a bore end within said nut body;
    biasing means positioned in the bore end;
    a plunger positioned in said bore against said biasing means, said plunger being provided with a rod receiving aperture, said aperture being threaded on one side only;
    a set screw positioned in said face parallel to said axial bore;
    said plunger having a conical recess adapted to engage said set screw;
    whereby tightening of said set screw will force said threaded portion of said aperture tightly against said threaded rod, and prevent movement thereof.

2. A retrofit apparatus according to claim 1, further comprising a mounting plate on which said indicator is mounted, said mounting plate being of sufficient length to overlap both ends of said indicator, whereby said indicator is protected from damage.

3. A housing retrofit assembly for use on a milling machine, wherein the milling machine includes a frame presenting a quill head, a quill supported on the head for rotation and for selective movement along a generally vertical axis between retracted and extended positions, and a manually actuated lever supported on the head and operatively connected to the quill for moving the quill between the retracted and extended positions, the assembly comprising:

a mounting cover having an elongated, centrally located aperture;

a scale slidably mounted to the mounting cover;

an indicator for measuring the displacement of the quill as the quill is moved between the retracted and extended positions, the indicator providing a digital reading of the vertical displacement of the quill from a starting position;

a slide support for attachment to said scale having a plurality of holes located on opposing ends of said support thereby enabling connection to a quill stop bar, said stop bar having a cylindrical configuration and being adapted to be fixed to the support at one end and be matingly engaged to a quill stop mount at an opposing end;

a clamp mount disposed between said support and said scale, wherein said clamp mount is attached to the mounting cover by an attachment means;

a cylindrical graduated rod which is matingly secured to the quill stop mount, wherein said graduated rod vertically moves responsive to the movement of a quill device thereby causing the scale to slidably move along the indicator; and a two-way or three-way circuit breaker switch for activating and deactivating the machine.

4. A housing retrofit assembly for use on a milling machine, wherein the milling machine includes a frame presenting a quill head, a quill supported on the head for rotation and for selective movement along a generally vertical axis between retracted and extended positions, and a manually actuated lever supported on the head and operatively connected to the quill for moving the quill between the retracted and extended positions, the assembly comprising:

a mounting cover having an elongated, centrally located aperture;

a scale slidably mounted to the mounting cover;

an indicator for measuring the displacement of the quill as the quill is moved between the retracted and extended positions, the indicator providing a digital reading of the vertical displacement of the quill from a starting position;

a slide support for attachment to said scale having a plurality of holes located on opposing ends of said support thereby enabling connection to a quill stop bar, said stop bar having a cylindrical configuration and being adapted to be fixed to the support at one end and be matingly engaged to a quill stop mount at an opposing end;

a clamp mount disposed between said support and said scale, wherein said clamp mount is attached to the mounting cover by an attachment means;

a cylindrical graduated rod which is matingly secured to the quill stop mount, wherein said graduated rod vertically moves responsive to the movement of a quill device thereby causing the scale to slidably move along the indicator; and means for mounting a light onto said mounting cover.

5. A housing retrofit assembly according to claim 4, further comprising a light mounted on said cover.

6. A housing retrofit assembly according to claim 4 wherein said light is a flexible extended light movable with said quill.

7. A housing retrofit assembly for use on a milling machine, wherein the milling machine includes a frame presenting a quill head, a quill supported on the head for rotation and for selective movement along a generally vertical axis between retracted and extended positions, and a manually actuated lever supported on the head and operatively connected to the quill for moving the quill between the retracted and extended positions, the assembly comprising:

a mounting cover having an elongated, centrally located aperture;

a scale slidably mounted to the mounting cover;

an indicator for measuring the displacement of the quill as the quill is moved between the retracted and extended positions, the indicator providing a digital reading of the vertical displacement of the quill from a starting position;

a slide support for attachment to said scale having a plurality of holes located on opposing ends of said support thereby enabling connection to a quill stop bar, said stop bar having a cylindrical configuration and being adapted to be fixed to the support at one end and be matingly engaged to a quill stop mount at an opposing end;

a clamp mount disposed between said support and said scale, wherein said clamp mount is attached to the mounting cover by an attachment means;

a cylindrical graduated rod which is matingly secured to the quill stop mount, wherein said graduated rod vertically moves responsive to the movement of a quill device thereby causing the scale to slidably move along the indicator;

a motor operatively connected to said quill; and a three-position rotary cam switch connected to and controlling said motor.

8. A housing retrofit assembly according to claim 7, further comprising a light assembly associated with said quill head, and having a light switch mounted on said quill head.

9. A housing retrofit assembly according to claim 8, wherein the light assembly has a power cord partially housed in said quill housing, said power cord having a coiled portion within said quill housing, which allows it to extend and retract as the light assembly moves with the quill head.

* * * * *